(12) United States Patent
Afonja et al.

(10) Patent No.: US 12,392,312 B2
(45) Date of Patent: Aug. 19, 2025

(54) WAVE ENERGY CONVERTER WITH PITCH RESONANCE TUNING TANKS AND PNEUMATIC TURBINES

(71) Applicant: VIRGINIA TECH INTELLECTUAL PROPERTIES, INC., Blacksburg, VA (US)

(72) Inventors: Adetoso Afonja, Blacksburg, VA (US); Stefano Brizzolara, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 436 days.

(21) Appl. No.: 17/662,355

(22) Filed: May 6, 2022

(65) Prior Publication Data

US 2022/0364541 A1 Nov. 17, 2022

Related U.S. Application Data

(60) Provisional application No. 63/184,888, filed on May 6, 2021.

(51) Int. Cl.
*F03B 13/14* (2006.01)
*F03B 13/24* (2006.01)

(52) U.S. Cl.
CPC ............ *F03B 13/142* (2013.01); *F03B 13/24* (2013.01); *F05B 2240/93* (2013.01)

(58) Field of Classification Search
CPC .... F03B 13/142; F03B 13/24; F05B 2240/93; F05B 2270/342; Y02E 10/30
See application file for complete search history.

(56) References Cited

U.S. PATENT DOCUMENTS

| 8,438,844 B2 * | 5/2013 | McCarthy | F03B 13/142 60/398 |
|---|---|---|---|
| 10,344,736 B2 * | 7/2019 | Abdelkhalik | F03B 13/16 |
| 2019/0368461 A1 * | 12/2019 | Korde | F03B 13/148 |

(Continued)

OTHER PUBLICATIONS

"NEMOH-Presentation—LHEEA," https://lheea.ec-nantes.fr/logiciels-et-brevets/nemoh-presentation-192863.kjsp. Apr. 2017.

(Continued)

*Primary Examiner* — Michael C Zarroli
(74) *Attorney, Agent, or Firm* — Perilla Knox & Hildebrandt LLP; Jason M. Perilla

(57) ABSTRACT

In one or more embodiments, a wave energy converter comprises a floater that is buoyant in a body of water. The floater has a geometry such that the floater pitches in an angular motion about a transverse axis in response to an incoming wave in the body of water. The floater includes a tank that has a plurality of vertical columns. At least one of the vertical columns includes an air turbine. The tank stores a volume of fluid and a volume of air. The volume of fluid in the vertical columns is connected by at least one horizontal conduit. In response to the floater pitching due to the incoming wave, a motion of the volume of fluid between the plurality of vertical columns via the at least one horizontal conduit causes air to be released or admitted via the air turbine to generate electrical power.

20 Claims, 18 Drawing Sheets

(56) References Cited

U.S. PATENT DOCUMENTS

2020/0056577 A1* 2/2020 Denniss .................. E02B 9/08

OTHER PUBLICATIONS

"WEC-Sim (Wave Energy Converter SIMulator)—WEC-Sim documentation," https://wec-sim.github.io/WEC-Sim/index.html. Retrieved Apr. 1, 2025.
A. Sarmento, L. Gato, and A. d. O. Falcao, "Turbine-controlled wave energy absorption by oscillating water column devices," Ocean Engineering, vol. 17, No. 5, pp. 481-497, 1990.
Afonja, A. J., (May 2020), "Dynamics of Pitching Wave Energy Converter with Resonant U-Tank Power Extraction Device," Virginia Tech. pp. 1-103.
Doyle, S., and Aggidis, G. A., 2019, "Development of multi-oscillating water columns as wave energy converters," Renewable and Sustainable Energy Reviews, 107, pp. 75-86.
Falcão, A. F. O., and Henriques, J. C. C., 2016, "Oscillating-water-column wave energy converters and air turbines: A review," Renewable Energy, 85, pp. 1391-1424.
Gato, L., Warfield, V., and Thakker, A., 1996, "Performance of a high-solidity Wells turbine for an OWC wave power plant." pp. 1-6.
Gunsing, M., Carette, N., and Kapsenberg, G., 2014, "Experimental Data on the Systematic Variation of the Internal Damping Inside a U-Shaped Anti-Roll Tank." pp. 1-10.
https://theliquidgrid.com/marine-clean-technology/wave-energy-converters/ Retrieved Mar. 28, 2025.
International Energy Outlook, Sep. 2017, pp. 1-151. www.eia.gov/outlooks/ieo Retrieved Mar. 28, 2025.
Ribeiro e Silva, S., Gomes, R. P. F., and Falcão, A. F. O., 2016, "Hydrodynamic optimization of the UGEN: Wave energy converter with U-shaped interior oscillating water column," International Journal of Marine Energy, 15, pp. 112-126.
Sheng, W., Alcorn, R., and Lewis, A., 2013, "On Thermodynamics in the Primary Power Conversion of Oscillating Water Column Wave Energy Converters," 5(2), p. 023105.
Silva, S., Vásquez, G., Guedes Soares, C., and Maron, A., 2011, "The Stabilizing Effect of U-Tanks as Passive Anti-Rolling Devices." pp. 1-9.
Sirigu, S. A., Bonfanti, M., Dafnakis, P., Bracco, G., Mattiazzo, G., and Brizzolara, S., "Pitch Resonance Tuning Tanks: A novel technology for more efficient wave energy harvesting," Proc. Oceans 2018 MTS/IEEE Charleston, pp. 1-8.
A. S. Sergej, "Development of a Resonance-Enforcing Wave Energy Converter Based on Sloshing Water Tank Technology," Ph.D. dissertation, Politecnico di Torino, 2019, pp. 1-265.
Filippo Giorcelli Rel. Giovanni Bracco, Giuliana Mattiazzo, Sergej Antonello Sirigu. Politecnico di Torino, Corso di laurea magistrale in Ingegneria Meccanica, "Techno-Economic Optimization Under Uncertainty of a Wave Energy Converter." 2021. pp. 1-116.
Afonja, Adetoso & Brizzolara, Stefano. (2020). "Dynamic Response of a Wave Energy Converter With Resonant U-Tank." pp. 1-10.

* cited by examiner

WAVE ENERGY CONVERTER WITH PITCH RESONANCE TUNING TANKS AND PNEUMATIC TURBINES

CROSS-REFERENCE TO RELATED APPLICATION

This application claims the benefit of and priority to U.S. Provisional Patent Application No. 63/184,888 filed May 6, 2021, entitled "WAVE ENERGY CONVERTER WITH PITCH RESONANCE TUNING TANKS AND PNEUMATIC TURBINES," the contents of which being incorporated by reference in their entirety herein.

BACKGROUND

A vast amount of energy is present in ocean waves, which when harvested, can provide substantial electrical supply to coastal countries. Studies have shown that the worldwide wave energy resource is about 93000 TWh/year. Research and testing of wave energy converters has been incentivized by the demand for cleaner and renewable energy sources.

BRIEF SUMMARY

Various embodiments are disclosed for a wave energy converter. In a first embodiment, a wave energy converter includes a floater that is buoyant in a body of water, the floater having a geometry such that the floater pitches in an angular motion about a transverse axis in response to an incoming wave in the body of water. The converter also includes a tank in the floater having a plurality of vertical columns, at least one of the plurality of vertical columns including an air turbine, the tank storing a volume of fluid and a volume of air, the volume of fluid in the plurality of vertical columns being connected by at least one horizontal conduit. In response to the floater pitching due to the incoming wave, a motion of the volume of fluid between the plurality of vertical columns via the at least one horizontal conduit causes air to be released or admitted via the air turbine to generate electrical power.

A second embodiment includes a method for converting kinetic energy of an incoming wave on a body of water to electrical energy. The method also includes determining at least one actual or predicted characteristic of the incoming wave. The method also includes based at least in part on the at least one actual or predicted characteristic, modifying a volume of fluid in a tank of a floater on the body of water, the floater being buoyant in the body of water, the floater having a geometry such that the floater pitches in an angular motion about a transverse axis in response to the incoming wave, the tank having a plurality of vertical columns, at least one of the plurality of vertical columns including an air turbine, the tank storing the volume of fluid and a volume of air, the volume of fluid in the plurality of vertical columns being connected by at least one horizontal conduit. The method also includes in response to the floater pitching due to the incoming wave, converting the kinetic energy of the incoming wave to the electrical energy by a motion of the volume of fluid in the tank causing air to be released or admitted via the air turbine.

A third embodiment is a wave energy converter that also includes a floater that is buoyant in a body of water, the floater having a geometry such that the floater pitches in an angular motion about a transverse axis in response to an incoming wave in the body of water. The converter also includes a tank in the floater having a plurality of vertical columns, the tank storing a volume of fluid and a volume of air, the volume of fluid in the plurality of vertical columns being connected by at least one horizontal fluid conduit, the volume of air in the plurality of vertical columns being connected by at least one horizontal air conduit. The converter also includes an air turbine in the at least one horizontal air conduit. The converter also includes where in response to the floater pitching due to the incoming wave, a motion of the volume of fluid between the plurality of vertical columns via the at least one horizontal fluid conduit causes air to be released via the air turbine to generate electrical power.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
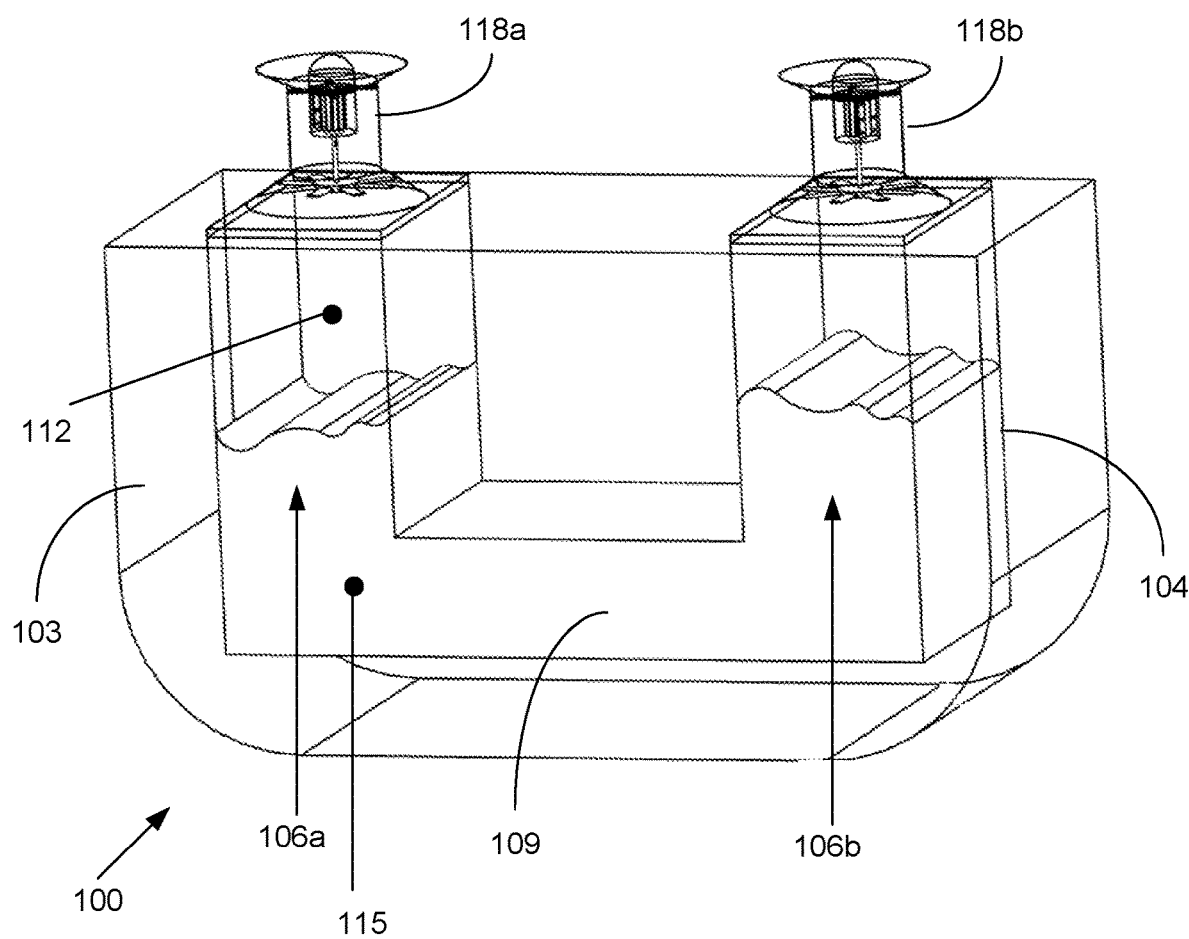
FIG. 1 is a perspective view of a wave energy converter according to one or more embodiments of the present disclosure.

The present disclosure relates to a wave energy converter utilizing a pitch resonance tuning tank and one or more air turbines. A pitching wave energy converter (WEC) device is described, based at least in part on a pitching resonant floater, a pitch resonance tuning tank system and self-rectifying air turbines, such as Wells turbines, in regular head waves. The device may have a bow/stern symmetry, which gives an advantage of the tank being strongly coupled with the floater in the pitch degree of freedom. The tank may include two or more vertical columns, which in some embodiments have separate air turbines or may share an air turbine in other embodiments.

An integrated dynamic model coupling the tank system as given with the motion of the floating body in regular waves and the power take off (PTO) device is physically and mathematically defined. This coupling effectively creates a multi-body dynamic system and thus alters the motion response amplitude operator of the device in waves creating multiple resonance peaks. The integrated dynamic model may be solved in time domain to account for non-linearities. Excitation, radiation and diffraction forces may be calculated in frequency domain from a 3D boundary element method (BEM) and corrected by Cummins equation (convolution integral) for memory effects to be used in the time domain solution. The time dependent motion of the free surface of the water in the tank creates a pressure difference inside the chamber with respect to the atmosphere which is used by the PTO turbine. The dynamic model of the integrated system may be used to predict the maximum extracted power for a given incident wave power. A systematic study, considering a change in PTO damping is performed to search for the maximum extracted power in any given regular wave condition.

One type of WEC is the oscillating water column (OWC). An example is the LIPET OWC plant in Scotland that is rated 500 kW. A typical OWC is a device mostly incorporated in a breakwater system onshore in which the incident wave causes the free surface of a single chamber with air volume to oscillate, thereby driving air in and out of an opening connected to a power take off (PTO).

Various embodiments of the present disclosure introduce a pitching WEC incorporating a resonant tank (e.g., a U-tank) having multiple vertical columns, or chambers, with each vertical column acting as a respective OWC. A model may describe the dynamics of the tank which can be used to determine its free surface motion and moments.

Another pitching WEC, the Inertial Ocean Wave Energy Converter (IOWEC), uses one or more Pitch Resonance Tuning Tanks (PRTT) as a way to shift the pitch natural period of the floater, thus improving the efficiency of a gyroscopic power take off (PTO) in waves of open oceans. The dynamics of the gyroscope, the floater, and the tank can be used to estimate the amount of power that the PTO can extract. Yet another pitching WEC that utilizes an OWC for power extraction is the UGEN, which has an asymmetric bow/stern and has a top duct connecting the tanks-top air-chambers to a single turbine in air.

U-tanks had traditionally been used in ocean structures to dampen their roll motion response. However, if tuned, this same device has the potential to amplify the motion response of a device and can create a second resonance peak due to the interactions of these dynamic systems.

Various embodiments of the present disclosure introduce a pitching WEC device, based on a pitching resonant floater, a tank system, and air turbines in regular head waves. This device may have a bow/stern symmetry, which gives an advantage of the tank being strongly coupled with the floater in the pitch degree of freedom. In one embodiment, each vertical column of the tank has separate air turbines. Hence each vertical column operates as an anti-symmetric OWC, with an advantage that if one air turbine is offline, power can still be generated from the operation of the other one.

Unlike conventional OWC which are mostly incorporated into breakwater dams and as such suffers from reduction in wave energy due to interaction with the seabed, this floating device benefits from a much higher energy from incoming wave because it can be deployed in deep-water where surface wave action has energy that had not suffered from losses due to seabed interactions (shoaling). Another major advantage of this device in some embodiments is that the contact with sea water is the hull of the floater and as such will not be susceptible to maintenance cost associated with devices that have submerged moving parts in sea water.

Nomenclature used herein includes:
$a_{ij}$ Floater added mass term
$b_{ij}$ Floater damping term
$c_{ij}$ Floater hydrostatic restoring term
dh Water surface height in the U-tank relative to calm level
$d_t$ Turbine diameter
$I_{ij}$ Floater moment of inertia
$k_t$ Turbine coefficient
N Turbine rotational speed
$p_a$ Atmospheric pressure
$P_{pto}$ Power across power takeoff device
$P_w$ Power supplied by internal water interface in tank
$Q_p$ Flow-rate across power take off device
$Q_W$ Flow-rate driven by internal water interface in tank
$x_{ij}$ Floater motion response
$\tau$ Tank pitch motion response
$\gamma$ Specific heat ratio of air (1.4)
$\rho_a$ Air turbine reference density FIG. 1 is a perspective view of a wave energy converter 100 according to one or more embodiments. The wave energy converter 100 includes a floater 103. The floater 103 is a barge-like structure that is configured to be buoyant within a body of water. In various examples, the body of water may be a freshwater, brackish, or marine environment, and the buoyancy of the floater 103 may be designed based at least in part of the salinity of the body of water. The floater 103 may be constructed of concrete, plastic, light iron, stainless steel, or another suitable material, where the floater 103 encloses an amount of air or other gas for buoyancy. The amount of air or gas may be fixed or controllable. The floater 103 has a geometry (e.g., rounded corners) such that the floater 103 pitches in an angular motion about a transverse axis in response to an incoming wave in the body of water.

The floater 103 includes a tank 104 having a plurality of vertical columns 106a, 106b, which are connected to one another by at least one horizontal conduit 109. Where there are two vertical columns 106, the tank 104 may have a U-shape and may be referred to as a U-tank. However, in another embodiment, the tank 104 may have three vertical columns 106 and a W-shape, or even four or more vertical columns 106. The vertical columns 106 each stores or encloses a volume of air 112 and a volume of fluid 115. The fluid may be water or another fluid. The volume of fluid 115 in the vertical columns 106 may be connected by the horizontal conduit(s) 109, which allow for the exchange of fluid between the vertical columns 106 in response to pitching motion. The volume of fluid 115 may be an important parameter for optimization of energy conversion, and the floater 103 may include a pump or discharge mechanism for adding or removing fluid to or from the volume of fluid 115.

In this example, each of the vertical columns 106 has a respective air turbine 118a, 118b. When the floater 103 pitches due to an incoming wave, the motion of the volume of fluid 115 in the vertical columns 106 causes air to be released or admitted via the air turbines 118 in order to generate electrical power. For example, in response to the pitching motion when a U-tank is used, air is simultaneously released from one air turbine 118 and admitted via the other air turbine 118.

In various embodiments, the electrical power generated by the wave energy converter 100 may be stored in a battery on the floater 103 and retrieved as necessary, or the wave energy converter 100 may be converted to a load, or an electrical grid, by one or more power transmission lines. Power generated by multiple wave energy converters 100 may be aggregated together. In various examples, the power is output as direct current (DC) from the wave energy converters 100.

The floater dynamics in regular oscillatory response can be represented by the equation of motion of a rigid body subjected to 6 degrees of freedom (DOF).

$$\Sigma_{j=1}^{6}[(I_{ij}+a_{ij})\ddot{x}+b_{ij}\dot{x}_j+c_{ij}x_j]=F_i \quad i=1:6 \qquad \text{(Equation 1)}$$

Figure 2:
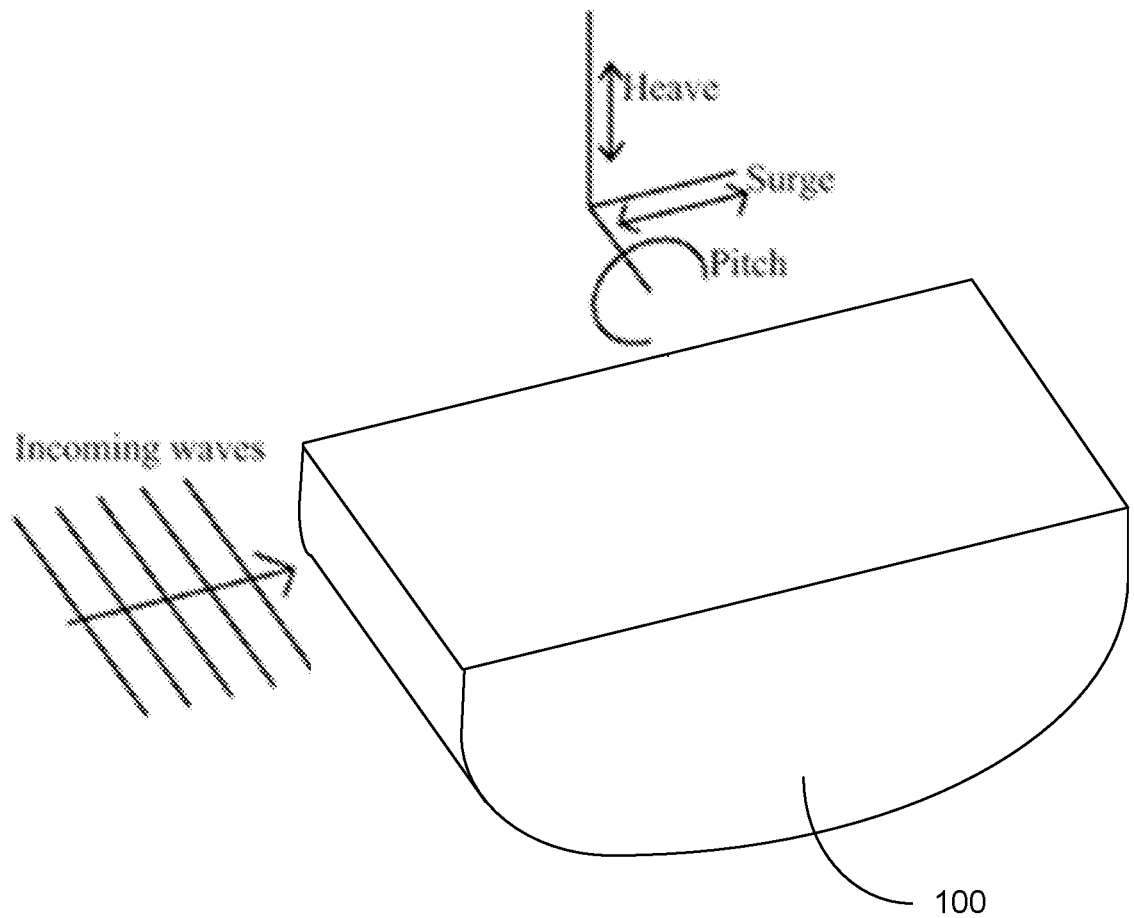
FIG. 2 is a drawing illustrating the wave energy converter relative to incoming waves with respect to the three degrees of freedom.

FIG. 2 is a drawing illustrating the wave energy converter 100 relative to incoming waves with respect to the three degrees of freedom. With the degrees of freedom as the three translational, surge ($x_1$), sway ($x_2$), heave ($x_3$), and rotational roll ($x_4$), pitch ($x_5$), yaw ($x_6$). The motions are excited by forces and moments induced by external sources, in this case incident waves and mooring lines. Since the hull may have starboard/portside and fore/aft symmetry and the mooring system may allow for weather vaning, such that the device always aligns with the incident wave direction, the vertical plane motions (surge, pitch and heave) are uncoupled from the lateral plane motions. Therefore, only the 3 degrees of motion (vertical plane) may be considered to solve the dynamics of the floater in regular sea state.

To obtain the hydrodynamic parameters, namely, added mass ($a_{ij}$), damping ($b_{ij}$) and hydrostatic restoring ($c_{ij}$) terms of the floater, the potential flow assumption (inviscid, incompressible, irrotational and that the floating body is rigid) is applied as usual. The unsteady pressure around the surface of the rigid body can then be calculated. A three-dimensional, unstructured, boundary element method (BEM) may be used to solve the potential flow problem and obtain the frequency dependent added mass, damping term, and other hydrodynamic properties of the floater.

TABLE 1 illustrates floater properties for a non-limiting example of a wave energy converter 100:

| | |
|---|---|
| Length [m] | 46 |
| Height [m] | 18.8 |
| Width [m] | 27 |
| Draft (from keel) [m] | 10.4 |
| COG (below draft) [m] | −1.7 |
| Displacement [tonnes] | 10217 |
| $I_{roll}$ [kgm$^2$] | 6.67E08 |
| $I_{pitch}$ [kgm$^2$] | 1.72E09 |
| $I_{yaw}$ [kgm$^2$] | 1.763E09 |

Figure 3:
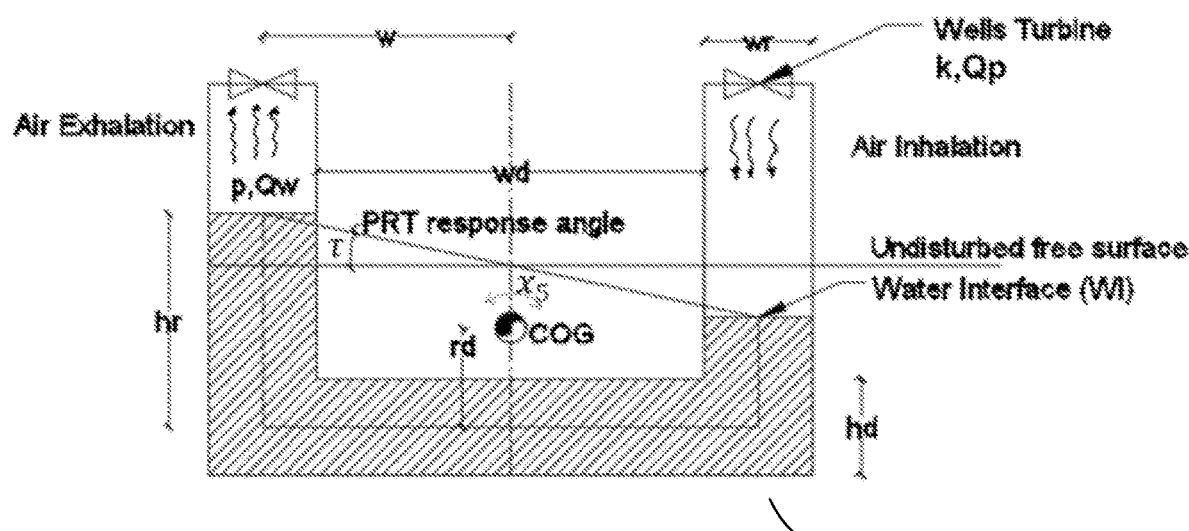
FIG. 3 is a schematic side view of an example of a wave energy converter showing its dimensional parameters.

FIG. 3 is a schematic side view of an example of a wave energy converter 100 showing its dimensional parameters.

The dynamic equations are provided for the angular motion τ of the fluid in a tank having multiple vertical columns coupled with the motion of the hull that contains the tank. In this model, the dynamic response of the free surface of the sloshing tank are defined based on hydrodynamic parameters, $a_{\tau\tau}$, $b_{\tau\tau}$, $c_{\tau\tau}$, that are dependent on the tank geometry:

$$a_{\tau 1}\ddot{x}_1+a_{\tau 5}\ddot{x}_5+c_{\tau 5}x_5+a_{\tau 6}\ddot{x}_6+a_{\tau\tau}\ddot{\tau}+b_{\tau\tau}\dot{\tau}+c_{\tau\tau}\tau=0 \qquad \text{(Equation 2)}$$

Since the device is allowed to weather vane to orient itself in the incoming wave direction, the hydrodynamic forces affecting the response of the tank will be mostly dominated by pitch response of the device and contributions from surge ($x_1$) and yaw ($x_6$) can be neglected. Therefore, the tanks dynamic equation reduces to:

$$a_{\tau 5}\ddot{x}_5+c_{\tau 5}x_5+a_{\tau\tau}\ddot{\tau}+b_{\tau\tau}\dot{\tau}+c_{\tau\tau}\tau=0 \qquad \text{(Equation 3)}$$

Considering a general expression of the floater pitching motion $x_5=x_{50}e^{i\omega t}$ in regular wave, and the motion response of the fluid in the tank $\tau=\tau_0 e^{i\omega t}$, a response amplitude operator (RAO) can be defined as:

$$\frac{\tau_0}{x_{50}} = \frac{c_{\tau 5} - a_{\tau 5}\omega^2}{\sqrt{(c_{\tau\tau} - a_{\tau\tau}\omega^2)^2 + b_{\tau\tau}^2\omega^2}} \qquad \text{(Equation 4)}$$

The inertial $a_{\tau\tau}$ and damping $b_{\tau\tau}$ terms from equation 3 may be estimated values and may be further calibrated. These parameters may be frequency dependent. In the absence of experimental values, computational fluid dynamics (CFD) simulation can be used.

Power is extracted from this device by the flow of air through an air turbine. In order to calculate the amount of power that can be extracted, the thermodynamic evolution of air within the vertical column may be determined. Since there is a flow reversal in an OWC, a self-rectifying turbine may be used. The Wells turbine is a self-rectifying turbine that is able to maintain rotation in one direction irrespective of the direction of flow. The Wells turbine has a linear relation between the pressure (p) and flow rate ($Q_p$) across the turbine.

From dimensional analysis of incompressible flow turbomachinery, the turbine characteristics can be expressed by means of non-dimensional coefficients of pressure Ψ, flow rate Φ and turbine power output coefficient Π, defined as follows:

$$\Psi = \frac{p}{\rho_a N^2 d_t^2} \qquad \text{(Equation 5)}$$

$$\Phi = \frac{\dot{m}}{\rho_a N d_t^3} \qquad \text{(Equation 6)}$$

-continued $$\Pi = \frac{P_{pto}}{\rho_a N^3 d_t^5} \quad \text{(Equation 7)}$$

$$\frac{p}{\rho_a N^2 d_t^2} = k_t\left(\frac{Q_p}{N d_t^3}\right), \text{ where } \left(Q_p = \frac{\dot{m}}{\rho_a}\right) \quad \text{(Equation 8)}$$

$$p = k_w Q_p, \text{ where } \left(k_w = \frac{N\rho_a}{k_t d_t}\right) \quad \text{(Equation 9)}$$

$P_{pto}$ is the power extracted across the turbine and $k_w$ is the turbine damping. In one example, a turbine comprises of an 8-blade rotor with two rows of guide vanes on each side of the rotor, with a hub-to-tip diameter ratio of 0.591, blades cross section varies from NACA0015 at the hub to NACA0012 profile at the tip.

Analytical equations are derived for the thermodynamic evolution of chamber air pressure (p) and air volume (V) in an OWC in the presence of a turbine extracting power from the process. An isentropic process may be assumed, the PTO flowrate ($Q_p$) may be calculated as a function of chamber pressure (p) relative to the atmosphere. A summary of the equations are presented as follows:

$$\frac{dV}{dT} + \frac{V}{\gamma p_a + p}\frac{dp}{dt} + \frac{p}{k_w} = 0 \text{ (exhalation)} \quad \text{(Equation 10)}$$

$$\left(1 + \frac{p}{\gamma p_a}\right)\frac{dV}{dt} + \frac{V}{\gamma p_a}\frac{dp}{dt} + \frac{p}{k} = 0 \text{ (inhalation)} \quad \text{(Equation 11)}$$

$$Q_p = Q_w - \frac{V}{\gamma p_a + p}\frac{dp}{dt} \text{ (exhalation)} \quad \text{(Equation 12)}$$

$$Q_p = \left(1 + \frac{p}{\gamma p_a}\right)Q_w - \frac{V}{\gamma p_a}\frac{dp}{dt} \text{ (inhalation)} \quad \text{(Equation 13)}$$

It is therefore possible to determine air chamber pressure or the volume once either is known. The time dependent volume of air in the chamber can be calculated, knowing $\tau$ assuming that the free surface of the water remains uniform across the depth. In this way, the water interface acts like a piston such that:

$$V = V_0 - A_0 dh \quad \text{(Equation 14)}$$

where $V_0$, $A_0$, dh are the undisturbed volume, free surface area and the time dependent vertical displacement of the water interface (WI) along the chamber centerline and $$\tau = \frac{2dh}{w}.$$

The flowrate of the water interface is calculated as:

$$Q_w = -\frac{dV}{dt} = \frac{A_0 w}{2}\tau \quad \text{(Equation 15)}$$

Once the coupled thermodynamic evolution of the air chamber and PTO is determined, the air pressure creates a moment which acts around the COG of the device. This thermodynamic process couples the dynamics of the U-tank by inducing an additional excitation moment. Therefore the coupled hydro—thermodynamic differential equations to be solved to capture the time dependent dynamics of the whole system are:

$$(M+a_{11})\ddot{x}_1 + b_{11}\dot{x}_1 = F_1(t)$$

$$(M+a_{33})\ddot{x}_3 + b_{33}\dot{x}_3 + c_{33}x_3 + a_{35}\ddot{x}_5 + b_{35}\dot{x}_5 + c_{35}x_5 = F_3(t)$$

$$(I_{55}+a_{55})\ddot{x}_5 + b_{55}\dot{x}_5 + c_{55}x_5 + a_{53}\ddot{x}_3 + b_{53}\dot{x}_3 + c_{53}x_3 - (a_{5\tau}\ddot{\tau} + c_{5\tau}\tau) = F_5(t) + pA_0 w$$

$$(a_{\tau 5}\ddot{x}_5 + c_{\tau 5}x_5) + a_{\tau\tau}\ddot{\tau} + b_{\tau\tau}\dot{\tau} + c_{\tau\tau}\tau + pA_0 w = 0 \quad \text{(Equation 16)}$$

alongside the equations 10-13 and the power provided by the water interface and power produced at the PTO given as:

$$P_w = pQ_w \quad \text{(Equation 17)}$$

$$P_{pto} = pQ_p \quad \text{(Equation 18)}$$

A numerical model was developed by creating a SIMULINK block which solves the resonant U-tank and air chamber/PTO thermodynamics. This block was coupled with the WEC-Sim SIMULINK library to solve the dynamics of the rigid body (floater).

Figure 4:
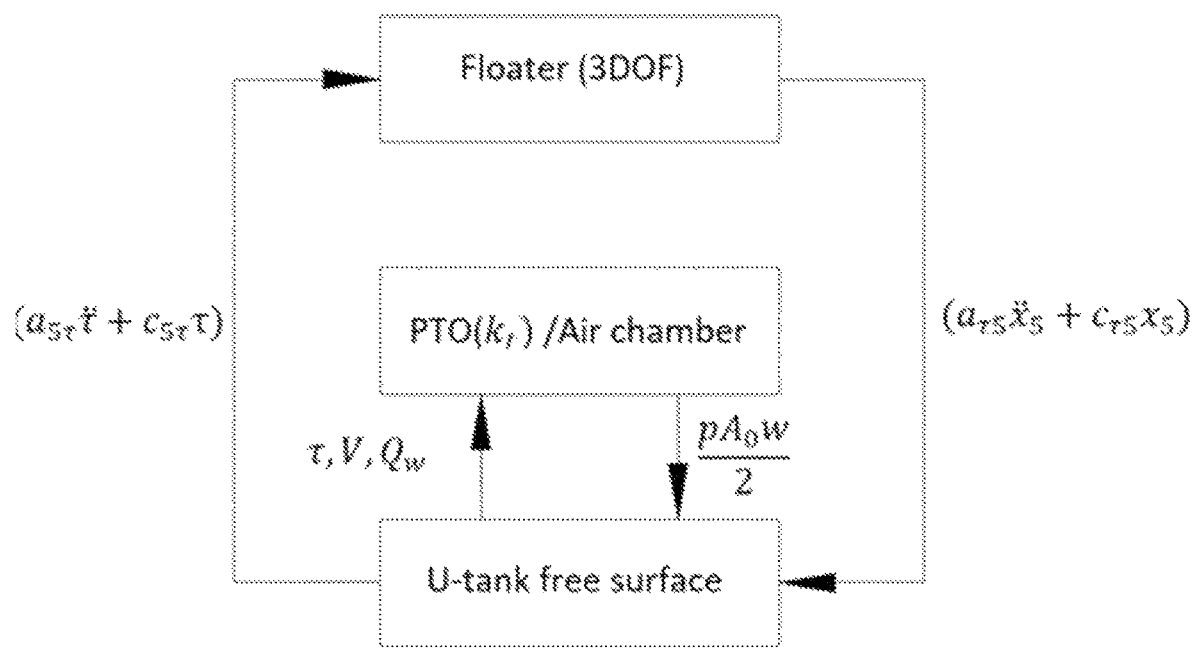
FIG. 4 is a block diagram of coupled hydro-thermodynamic process utilized in a wave energy converter according to one or more embodiments.

FIG. 4 is a block diagram of coupled hydro-thermodynamic process utilized in a wave energy converter 100 according to one or more embodiments.

With the free surface motion of the tank being numerically computed, the dynamic model can be validated to ascertain the motion of the tank. Using a model scale of the non-limiting example of the wave energy converter 100, simulations were carried out with Starccm+ unsteady RANSE solver using the Realizable K-Epsilon Two-Layer turbulence model with all y+ wall treatment and VOF model was used to track the air water interface. The implicit unsteady time discretization scheme was used with the target mean CFL set at 0.5 and target max at 1.0. Simulations were carried out on 54 cores with approximately 10 k cells per core. Each simulation taking about 5,833 hours of total solver CPU time to complete.

TABLE 2 illustrates small scale tank dimensions for a non-limiting example of a wave energy converter 100:

| | |
|---|---|
| $w_r$(m) | 0.17 |
| $h_r$(m) | 0.235 |
| $w_d$(m) | 0.514 |
| $h_d$(m) | 0.17 |
| $r_d$(m) | 0.063 |
| $h_t$(m) | 0.61 |
| $x_t$ (tank lateral depth)(m) | 0.1 |
| Inner fillet rad. (m) | 0.065 |
| Outer fillet rad. (m) | 0.115 |
| Datum water level (m) | 0.235 |
| CFD mesh size (m) | 0.0045 |

The validation was carried out on a model scale of the U-tank. Hence the simulation for validation was also done using a model scale. Experiments were performed by imposing an oscillatory angular regular motion with an input amplitude of 2°. The water level in the tank was recorded after the motion response of the tank stabilizes with a regular response and the experiment was repeated at different frequencies of oscillation. An additional simulation was performed considering a non-equilibrium initial condition, characterized by difference in water level between the two vertical reservoirs and following the free sloshing of the fluid in the tank (free decay).

TABLE 3 illustrates the change in water level (dh) and angle ($\tau$) of a U-tank free surface for experimental test and CFD in regular condition:

| Period(s) | dh (m) | | τ (rad) | |
|---|---|---|---|---|
| | Experiment | CFD | Experiment | CFD |
| 1.1 | 0.0026 | — | 0.0075 | — |
| 1.2 | 0.0096 | — | 0.0285 | — |
| 1.3 | 0.0352 | 0.0383 | 0.1027 | 0.1119 |
| 1.35 | 0.09 | 0.0744 | 0.2603 | 0.2175 |
| 1.4 | 0.154 | 0.1581 | 0.4332 | 0.4623 |
| 1.45 | 0.0565 | 0.0689 | 0.1543 | 0.2015 |
| 1.5 | 0.0383 | 0.0365 | 0.1126 | 0.1067 |
| 1.6 | 0.0261 | — | 0.0765 | — |
| 1.7 | 0.0216 | — | 0.0632 | — |
| 1.8 | 0.0189 | — | 0.0552 | — |

Figure 5:
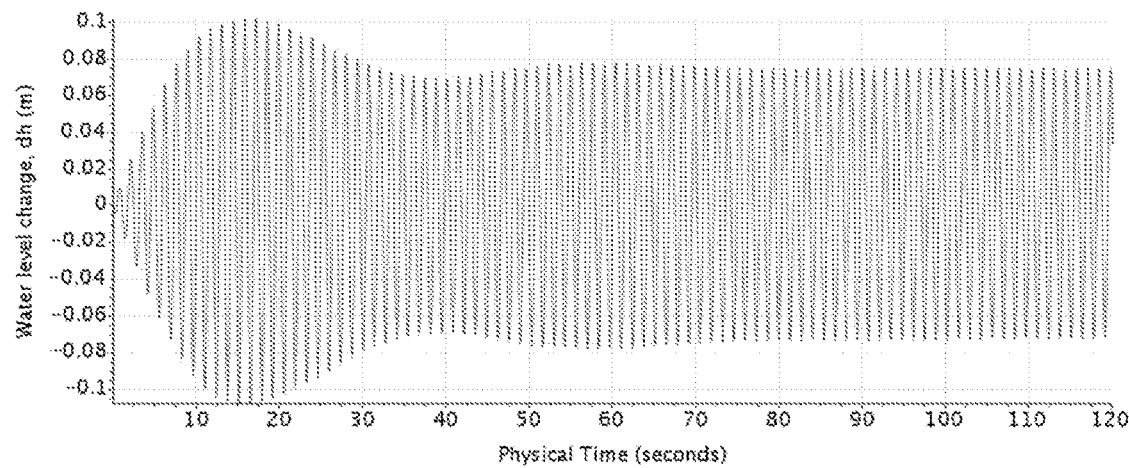
FIGS. 5-7 are charts illustrating the dynamic response of the tank of the wave energy converter at different forced oscillation periods according to one or more embodiments.
Figure 6:
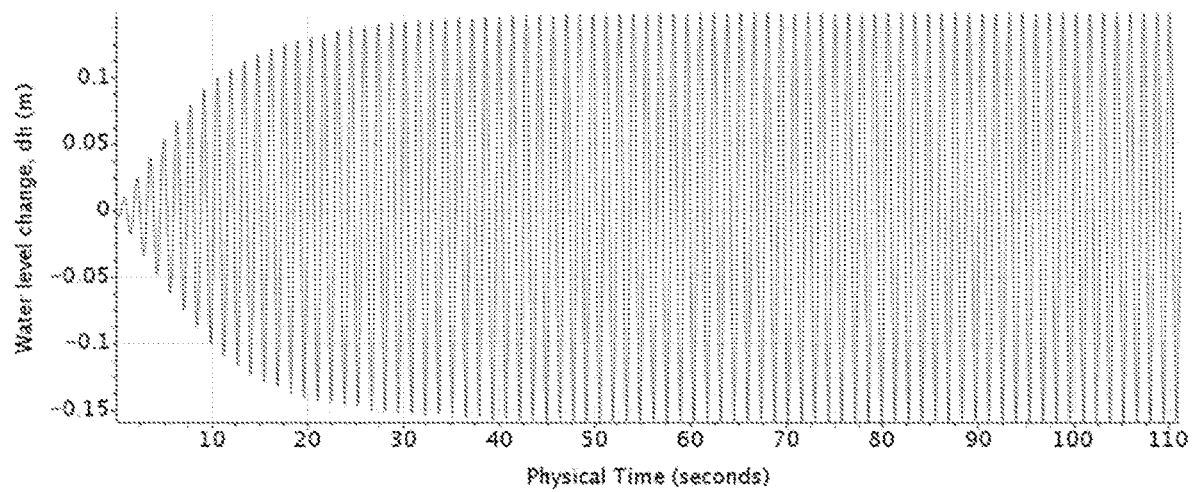
Figure 7:
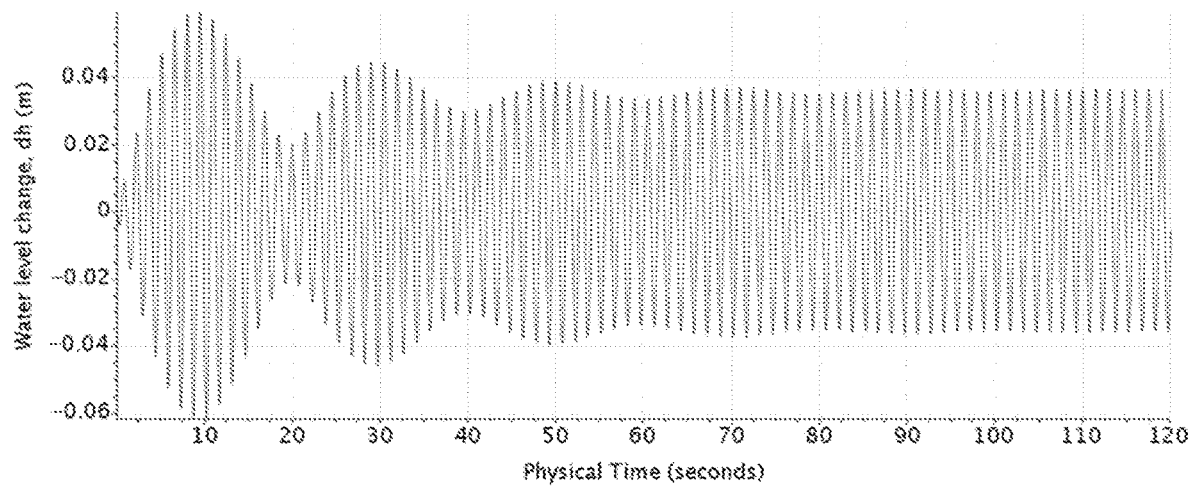
Figure 8:
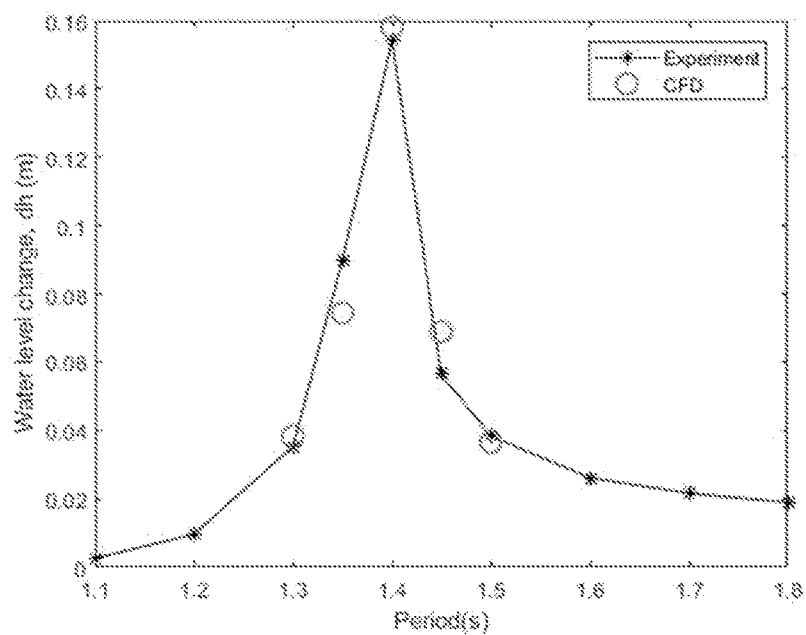
FIG. 8 is a chart illustrating the maximum pitch motion oscillation amplitude for forced sinusoidal tank motion according to one or more embodiments.

FIGS. 5-7 show the dynamic response of the tank at different forced oscillation periods. FIG. 5 shows results from a CFD Simulation with a regular forcing motion for a period of 1.35 s. FIG. 6 shows results from a CFD Simulation with a regular forcing motion for a period of 1.4 s. FIG. 7 shows results from a CFD Simulation with a regular forcing motion for a period of 1.5 s. At resonance, the U-tank will show the maximum amplitude. At this period, the temporal response of the tank to regular motion as seen in FIG. 8 will steadily increase to the maximum and will not drop or have multiple peaks as seen at other periods FIG. (7&9). This happens when the period of excitation motion equals the natural period of the U-tank and for this tank, it is 1.4 s. At other excitation periods due to the differences in natural period of the tank and the excitation motion, it took longer to achieve regular response and the time taken to achieve regular motion increases as we move further away from its natural period.

FIG. 8 shows the maximum pitch motion oscillation amplitude for forced sinusoidal tank motion, with a comparison between experiment and CFD results. From FIG. 8, the CFD model is able to predict much more accurate the experimental result at low, high, and resonance periods and slightly off for periods of 1.35 s and 1.45 s.

MATLAB non-linear parameter identification model was used to fit a curve to the tanks angular motion τ obtained from CFD using results in the region where the transient solution has stabilized and response is periodically oscillating. Since the tank hydrostatic restoring force is only dependent on change in water between the two chambers (creating a righting moment), $c_{\tau\tau}$ (tank's restoring term) was kept fixed while $a_{\tau\tau}$ and $b_{\tau\tau}$ where considered as free parameter (to be identified). The non-linear dynamic model used for curve fitting was developed using equation 3 and it finds the parameter that minimizes the error between the measured values τ from CFD and calculated values. This was done for free decay and regular motion simulations.

Figure 9:
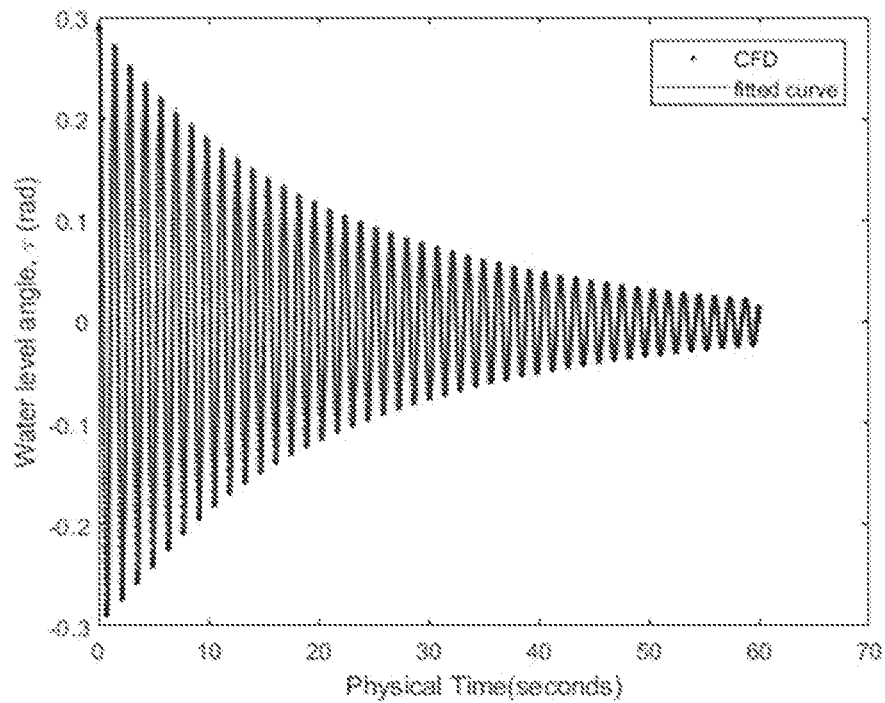
FIG. 9 shows a fitted curve to free decay test.

FIG. 9 shows a fitted curve to free decay test.

Figure 10:
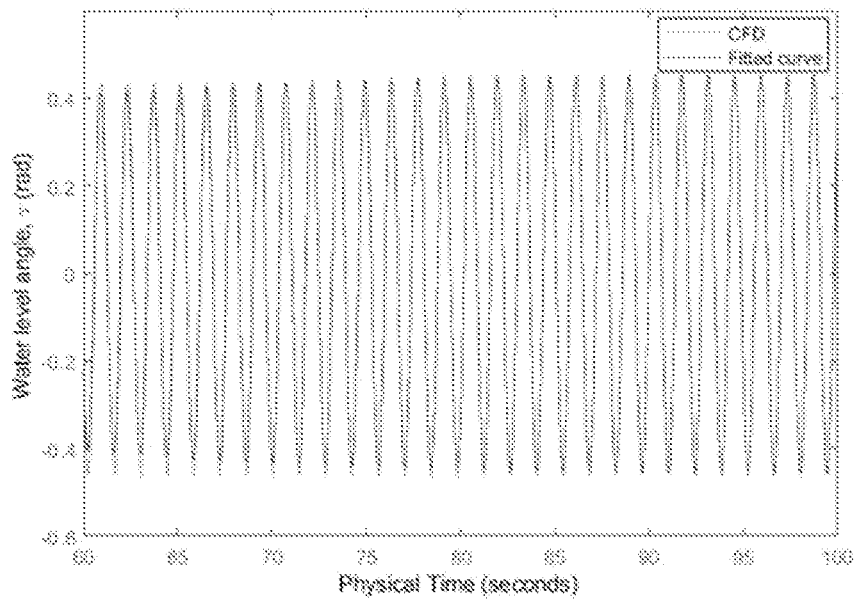
FIG. 10 shows a fitted curve to a regular forcing motion for a period t=1.4 s.

FIG. 10 shows a fitted curve to a regular forcing motion for a period t=1.4 s.

TABLE 4 shows identified hydrodynamic parameters from curve fitting, where the inertial term determined from curve fitting is $a_{\tau\tau}^*$:

| Period(s) | $\alpha_{\tau\tau}^*$ | $k_\tau$ | $b_{\tau\tau}$ | q | $c_{\tau\tau}$ |
|---|---|---|---|---|---|
| 1.3 | 1.8183 | 0.7944 | 0.109 | 0.0081 | 38.9 |
| 1.35 | 1.8937 | 0.8273 | 0.1323 | 0.0098 | 38.9 |
| 1.4 | 1.9406 | 0.8478 | 0.2587 | 0.0192 | 38.9 |
| 1.45 | 1.9100 | 0.8344 | 0.2193 | 0.0163 | 38.9 |
| 1.5 | 1.8742 | 0.8188 | 0.2184 | 0.0162 | 38.9 |
| Free decay | 1.9292 | 0.8394 | 0.1745 | 0.0130 | 38.9 |

RAOs for the experimental test and CFD can be computed by dividing the response amplitude of the U-tank's motion by the amplitude of the excitation motion. A model RAO can be computed from identified parameters using equation 4.

Figure 11:
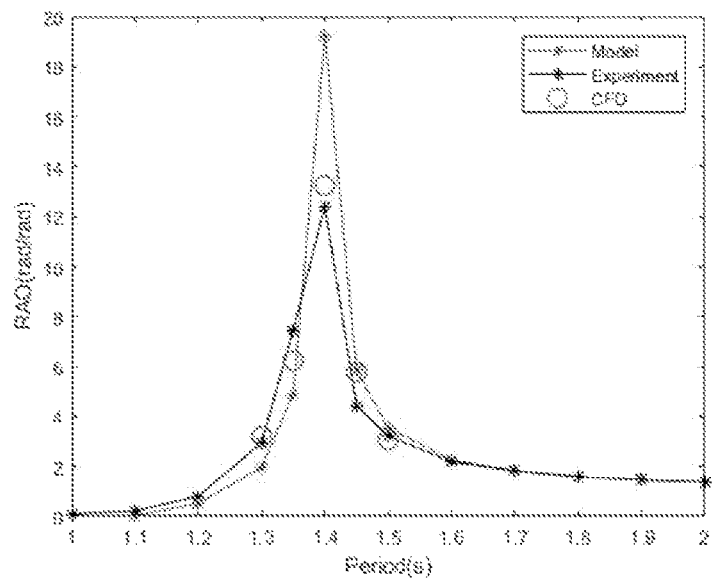
FIG. 11 shows a Pitch RAO using parameters identified from the decay test.

FIG. 11 shows a Pitch RAO using parameters identified from the decay test.

Figure 12:
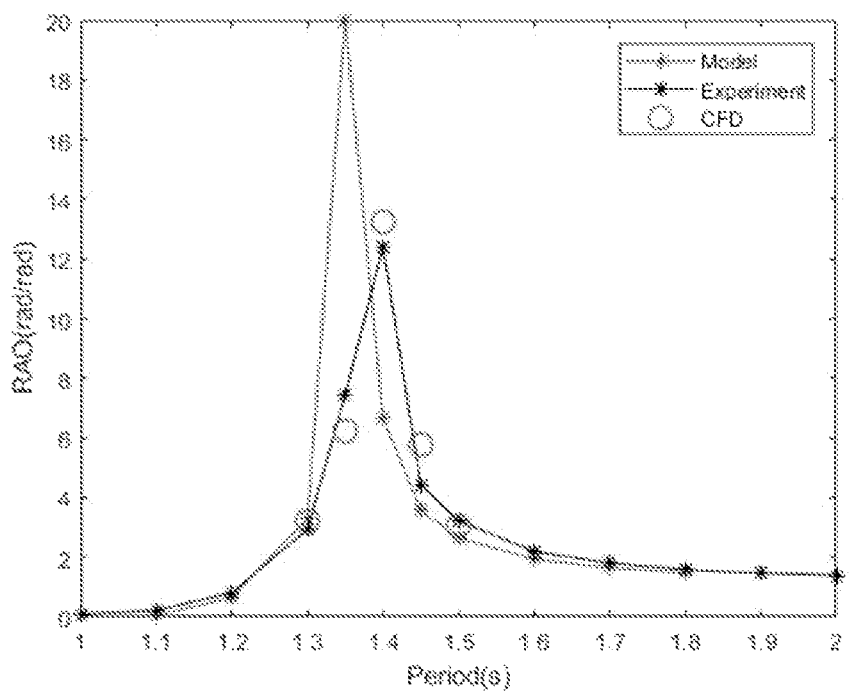
FIG. 12 shows a Pitch RAO using parameters identified from a regular motion at T=1.3 s.

FIG. 12 shows a Pitch RAO using parameters identified from a regular motion at T=1.3 s.

Figure 13:
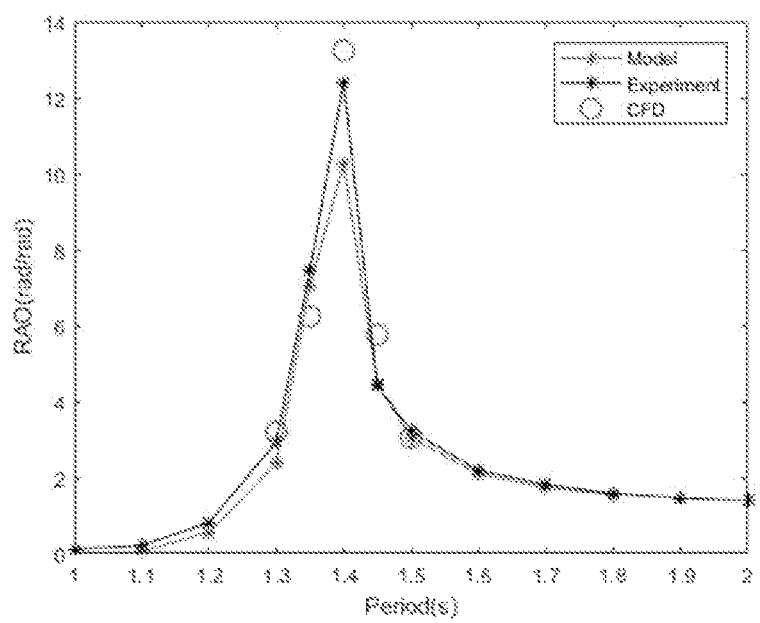
FIG. 13 shows a Pitch RAO using parameters identified from a regular motion at T=1.5 s.

FIG. 13 shows a Pitch RAO using parameters identified from a regular motion at T=1.5 s.

Figure 14:
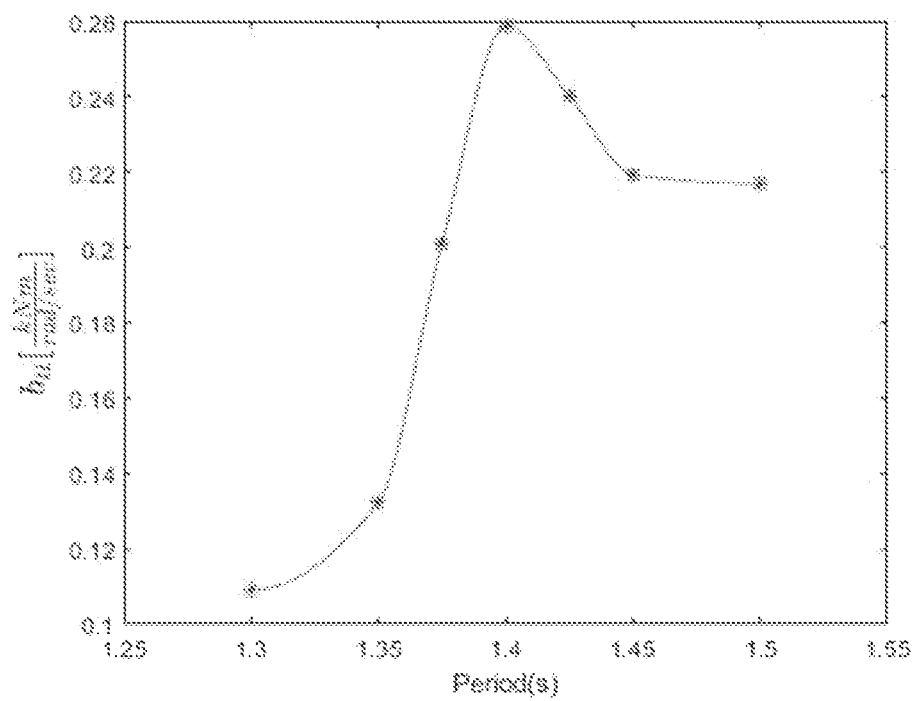
FIG. 14 shows a variation in damping term with period.

FIG. 14 shows a variation in damping term with period.

Figure 15:
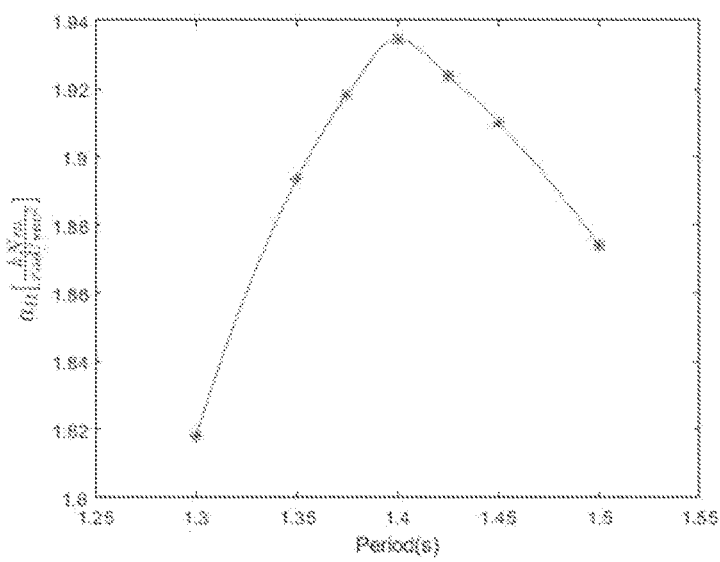
FIG. 15 shows a variation in inertia term with period.

FIG. 15 shows a variation in inertia term with period.

It can be seen from TABLE 4 and FIGS. 11-15 that the parameters change considerably with change in period. The computation of the RAOs using parameters identified from a particular period fails to predict the RAOs at other periods using an equation that assumes constant added mass and damping coefficients. Therefore, $a_{\tau\tau}^*(\omega)$ and $b_{\tau\tau}(\omega)$ in the dynamic equations may become frequency dependent variables. From equation 24, a frequency dependent inertial correction parameters $k_\tau$ and q can be calculated from equation 25 such that $$k_\tau = \frac{a_{\tau\tau}^*}{a_{\tau\tau}}$$

$$q = \frac{b_{\tau\tau}}{Q_t w_r \left(\frac{w}{2h_d^2} + \frac{h_r}{w_r}\right)}$$

where $a_{\tau\tau}$ is replaced with $k_\tau \cdot a_{\tau\tau}$ in the tank's dynamic equation.

The model is able to represent the RAOs at periods below 1.3 s (FIG. 12) using parameters identified at 1.3 s and similar for 1.5 s (FIG. 13) which performed well for periods above it. This phenomenon is perhaps due to the fact that at frequencies far from resonance, the tank has RAOs that do not change very much, which means the motion of the tank has lower amplitude. Conversely, at periods close to the resonance of the tank, the tank is much more excited, creating a lot of vortices, which contributes significantly to the tank's damping. Similarly, an increase in the inertial term as seen in FIG. 15 suggests that there is an added mass effect which increases with large amplitude oscillations.

The frequency dependency implies that if the u-tank motion is to be solved in irregular waves, it should be expressed in a similar way to that of a floating body subjected to irregular motion by introducing the convolution integral to account for memory effect.

$$(a_{\tau 5}\ddot{x}_5 + c_{\tau 5}x_5) + k_\tau a_{\tau\tau}(\infty)\ddot{\tau} + \int_0^t K_{\tau\tau}(t-\epsilon)\dot{\tau}(\epsilon)d\epsilon + c_{\tau\tau}\tau + \frac{pA_0w}{2} = 0$$

However, this may be limited to the system stabilized response in regular waves.

CFD simulations were carried out using the same CFD turbulence model and solvers as those used for the small-scale U-tank on a 2D full-scale model of the U-tank in regular condition in other to determine its hydrodynamic properties at different periods and amplitude of 1 degree. The location of the motion applied to the tank in CFD coincides with that of the overall device center of gravity. In order to balance accuracy and computational expense for full-scale study, simulations were carried out at periods close to resonance. Although, it has been showed in the previous section that at certain period away from resonance, the hydrodynamic parameters are able to predict the behavior of the tank for periods lower (FIG. 12) or higher (FIG. 13) respectively. However, in order to avoid extrapolation, analysis can be performed by limiting the wave period imposed on the device, within the limit of CFD investigation performed on the full scale U-tank. This is because as early stated, simulations at higher and lower frequencies are computationally expensive since the time required to achieve regular response is greatly increased for full scale U-tank. Additionally, simulations were also carried out in 2D as 3D are computationally expensive, notwithstanding, this is consistent with the equation which assumes 2D representation in its formulation.

With the tanks hydrodynamic properties known, the coupled hydro-thermodynamic problem could then be solved, as in equation 16 and FIG. 4.

Figure 16:
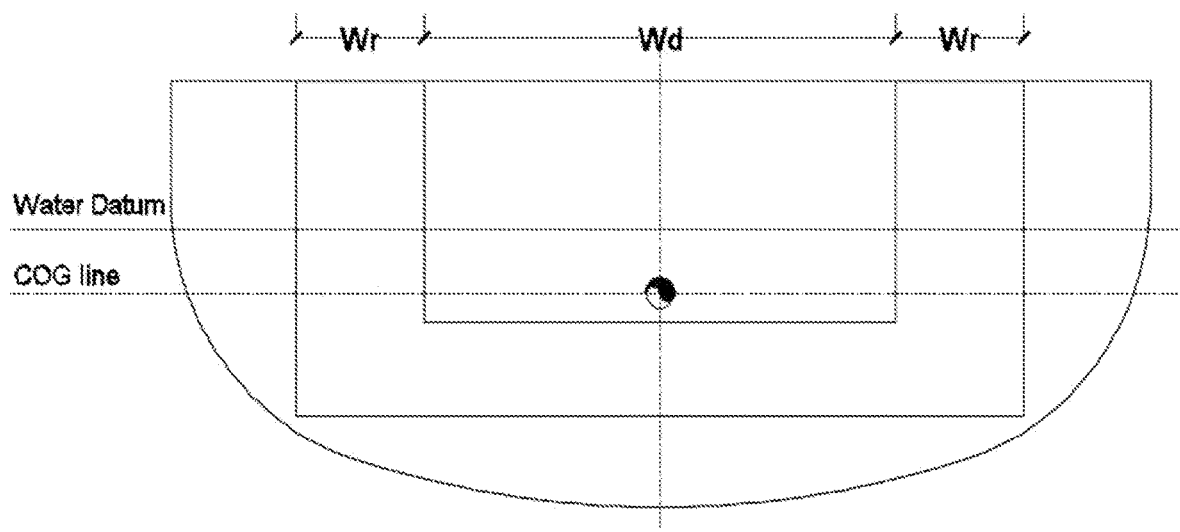
FIG. 16 illustrates a side view of a floater/tank configuration.

FIG. 16 illustrates a side view of a floater/tank configuration.

TABLE 5 shows full scale tank dimensions according to three examples:

|  | Type 1 | Type 2 | Type 3 |
| --- | --- | --- | --- |
| $w_r$(m) | 6 | 6 | 6 |
| $h_r$(m) | 6 | 8 | 6 |
| $w_d$(m) | 22 | 22 | 12 |
| $h_d$(m) | 4.18 | 4.18 | 4.18 |
| $r_d$(m) | 2.6 | 2.6 | 2.6 |
| $h_f$(m) | 14.75 | 14.75 | 14.75 |
| $x_f$(m) | 22.84 | 22.84 | 22.84 |
| CFD mesh size (m) | 0.0283 | 0.0283 | 0.0283 |

Parametric investigation was carried out by varying the tank dimensions (TABLE 5), while keeping the location of the center duct line to the floater COG ($r_d$) constant. It is also assumed that the device can be ballasted to retain its overall mass properties. From CFD results, system identification was conducted to determine the hydrodynamic properties (inertia term and damping) of the tank presentable in FIGS. 17 and 18.

Figure 17:
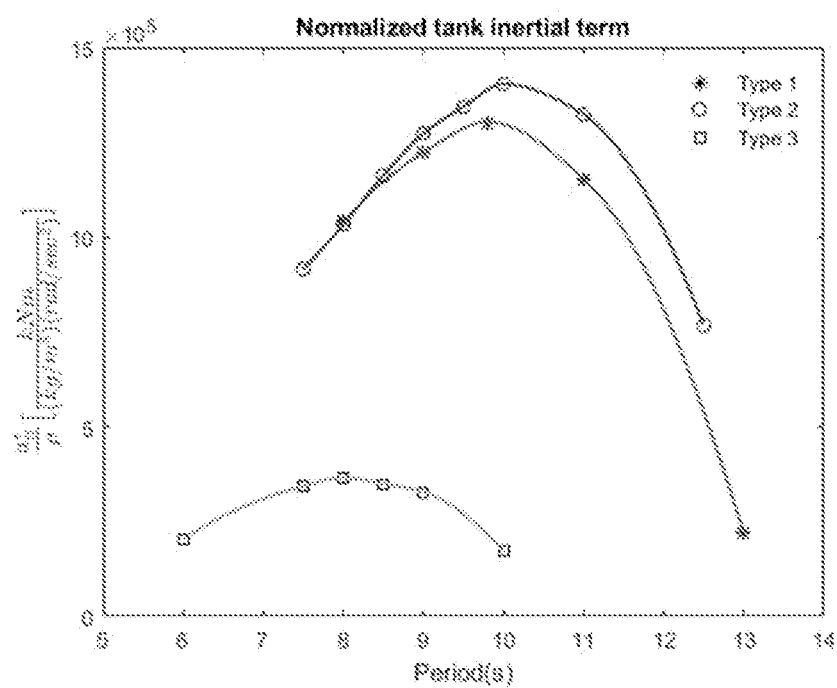
FIG. 17 illustrates a full-scale tank inertial term versus a period according to one or more embodiments.

FIG. 17 illustrates a full-scale tank inertial term versus a period according to one or more embodiments.

Figure 18:
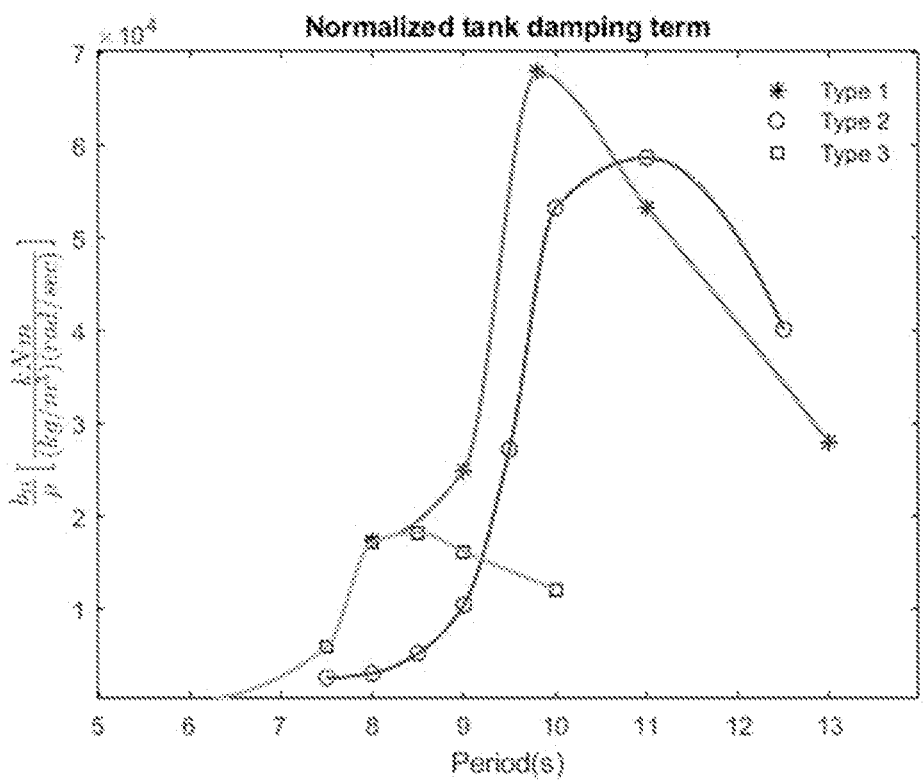
FIG. 18 illustrates a full-scale damping term versus a period according to one or more embodiments.

FIG. 18 illustrates a full-scale damping term versus a period according to one or more embodiments.

Figure 19:
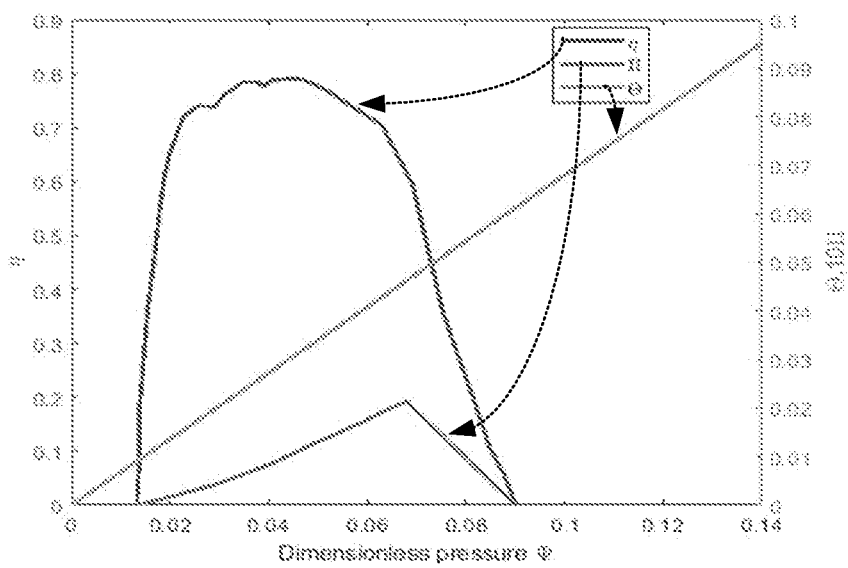
FIG. 19 illustrates an experimental result of Wells turbines with a guided vane.

FIG. 19 illustrates an experimental result of Wells turbines with a guided vane. A turbine coefficient $k_t$=0.6803 is used. FIG. 19 can be used to define Wells turbine properties. One weakness of Wells turbine is that it is prone to stalling at a high flowrate and its performance drops sharply. For this turbine, the stall condition is at 0.05 dimensionless flow rate. This condition was modelled in the WECSim-SIMULINK software built by limiting the maximum flow rate through the turbine at $0.05Nd_t^3$ and additional safety factor of 0.95 was used. This is similar to placing a relief valve in the system to divert the excess flow away from the turbine, that way, the turbine will not stall and power can still be generated.

Figure 20:
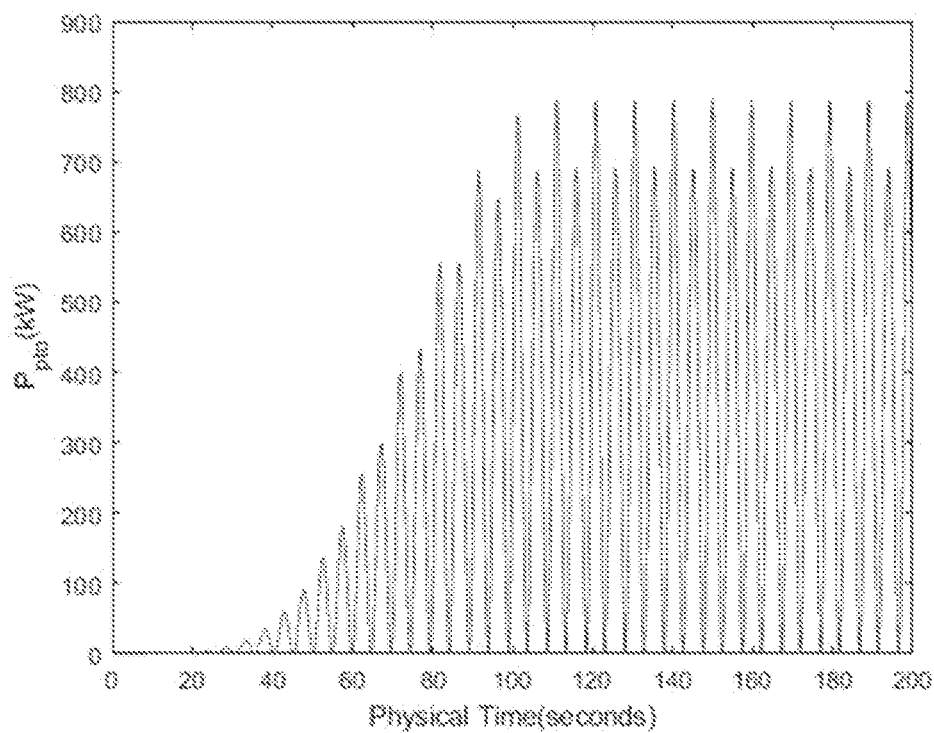
FIG. 20 illustrates an output produced across the PTO according to one or more embodiments.

FIG. 20 illustrates an output produced across the PTO according to one or more embodiments.

During inhalation and exhalation of air through the PTO, there exist slight density changes due to thermodynamic behavior of air which is slightly compressed when forced out during exhalation and slightly expanded when breadth in during inhalation, as a consequence, peak flow rate during this phases varies, and as such the reason for change in amplitude during each complete cycle.

Figure 21:
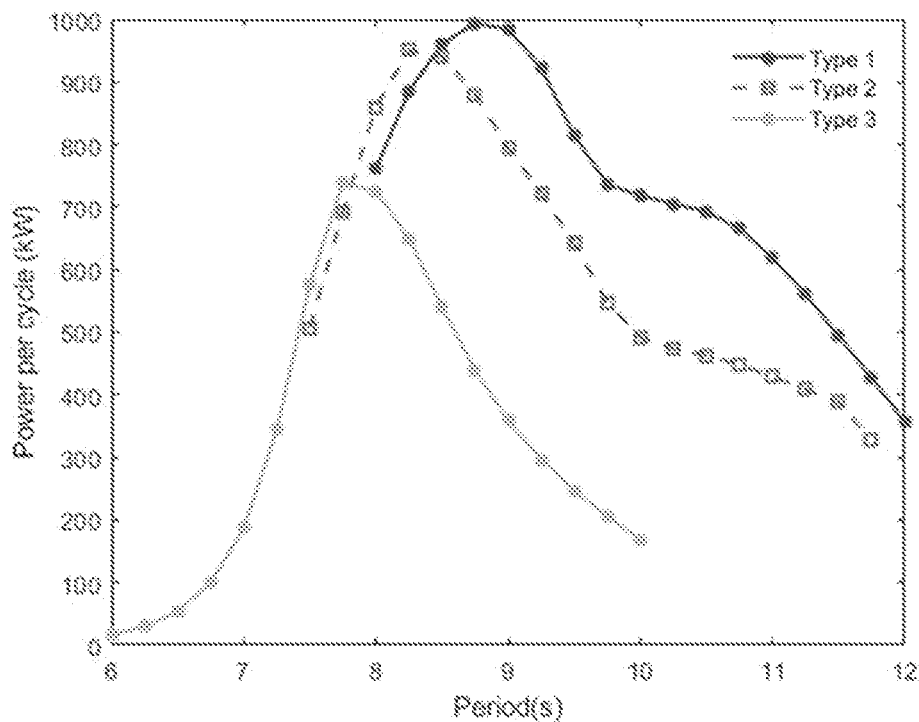
FIG. 21 shows power per cycle versus period for the tank types.

FIG. 21 shows power per cycle versus period for the tank types with damping ($k_w$=102 Pa·sm$^{-3}$) and wave height of 2.5 m. From FIG. 21, it can be seen that changing the duct length ($w_d$) not only shift the resonance period, but it also significantly affect power, while peak power per cycle does not change much by varying the tank reservoir height but it can be used to as a way to tune the tanks resonance period. This is important since predominant sea state conditions varies with seasons and it provides a very simple way to regulate the device operational condition to prevalent sea state. However, the range of operating period is wider for Type 1. Turbine property changes also affects the dynamics of the system, and a systematic study was carried out to see how changes in PTO damping affects the device. From equation 9, there are majorly two ways to alter the turbine properties, either by changing the rotational speed or by changing the diameter. Note that for instance, reduction in the diameter would increase PTO damping, which increases the chamber pressure and in turn impacts the flow rate through the turbine.

Figure 22:
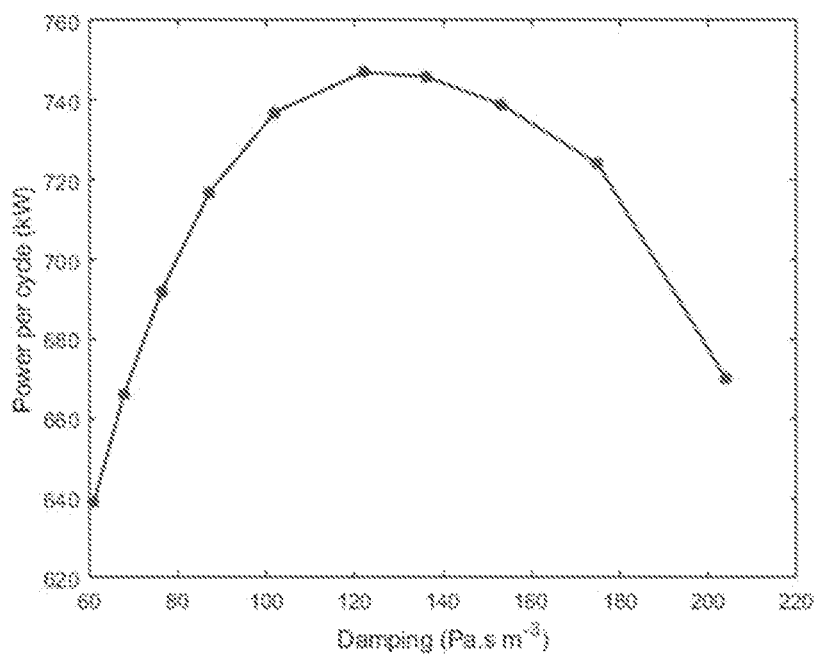
FIG. 22 shows power variation versus damping at a wave period of 9.75 s and a wave height of 2.5 m for device Type 1.

FIG. 22 shows power variation versus damping at a wave period of 9.75 s and a wave height of 2.5 m for device Type 1.

Figure 23:
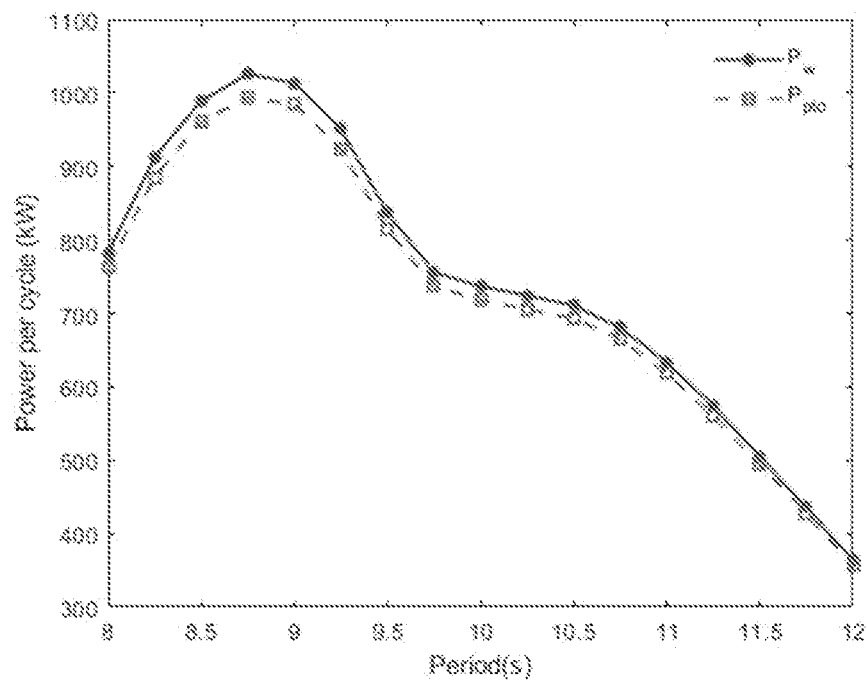
FIG. 23 shows per cycle across the PTO and power delivered by water interface motion.

FIG. 23 shows per cycle across the PTO and power delivered by water interface motion with damping ($k_w$=102 Pa·sm$^{-3}$).

Figure 24:
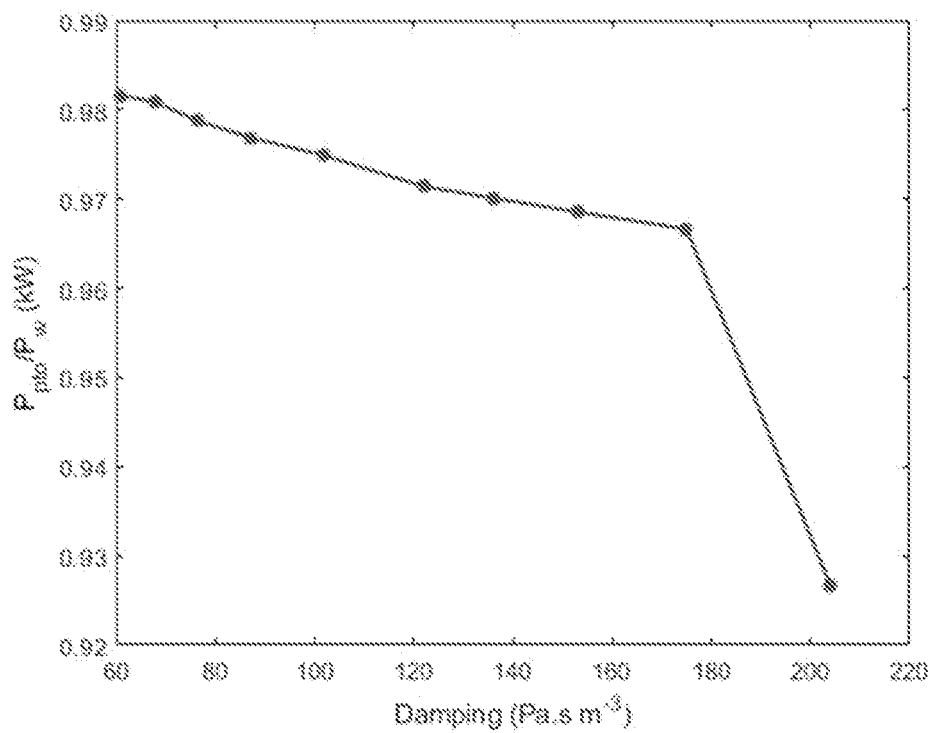
FIG. 24 shows the air efficiency of device Type 1 with wave height 2.5 m and period 9.75 s.

FIG. 24 shows the air efficiency of device Type 1 with wave height 2.5 m and period 9.75 s.

Figure 27:
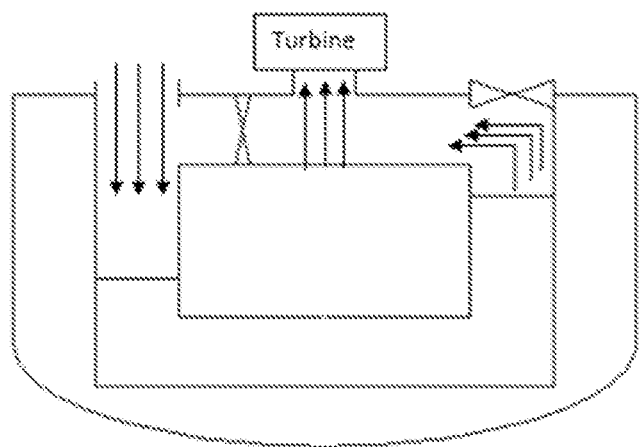

An increase in damping increases the compressibility of air in the chamber, this is because of higher pressure build up. This is evident as shown in FIG. 27 where the air efficiency which is ratio of the power across the PTO and power supplied the water interface reduces with an increase in damping.

Compressibility affects the efficiency of the internal water surface which is the piston like effects that transfers the motion of the floater to the turbine for power extraction. Higher values of the ratio $$\frac{P_{pto}}{P_w}$$

implies that the internal water surface has higher efficiency and more of the flowrate supplied by the internal water surface passes through the turbine for power generation.

Power through the PTO is a function of flowrate and pressure. An increase in damping, although increases the pressure, also reduces the flowrate, which means there exist an optimum value. Presented in FIG. 23 is the plot of power through the PTO which demonstrates the effect of damping, which for the Type 1 device leads to an optimum value of 122 Pa·sm$^{-3}$ at period of 9.75 s. Similarly, FIG. 21 shows that the air efficiency is higher at lower and higher periods because the separation between the 2 curves is smaller, than at resonance. At resonance, there exists large amplitude oscillations leading to higher volume changes, hence increased chamber air pressure and compressibility.

The present disclosure introduces a concept for ocean wave energy conversion and the physical/mathematical model to simulate the whole system dynamics. Hydrodynamic parameters of the simplified dynamic model of the U-tank sloshing are a function of frequency and not constants as most widely assumed. The identification of the system added mass and damping at a particular frequency (or through free decay) fails to model the behavior at other frequencies.

With the right sizing of the U-tank dimensions and PTO damping, this device can efficiently convert wave energy in different sea state conditions by altering the amount of water in the reservoir. This change of operational configuration removes complications that other WEC devices employ to regulate operating conditions to varying sea state.

Additional equations and parameters are provided below:

$$a_{\tau 5} = Q_t(r_d + h_r) \quad \text{(Equation 22)}$$

$$c_{\tau 5} = Q_t g \quad \text{(Equation 23)}$$

$$a_{\tau\tau} = Q_t w_r \left( \frac{w}{2h_d} + \frac{h_r}{w_r} \right) \quad \text{(Equation 24)}$$

$$b_{\tau\tau} = Q_t q w_r \left( \frac{w}{2h_d^2} + \frac{h_r}{w_r^2} \right) \quad \text{(Equation 25)}$$

$$c_{\tau\tau} = c_{5\tau} = Q_t g \quad \text{(Equation 26)}$$

$$Q_t = \frac{\rho_t w_r w^2 x_t}{2} \quad \text{(Equation 27)}$$

Where $a_{\tau 5}$ is a floater and U-tank inertial coupling term, $c_{\tau 5}$ is a floater and U-tank restoring coupling term, $a_{\tau\tau}$ is a U-tank inertial term, $b_{\tau\tau}$ is a U-tank damping term, q is a damping term coefficient of resistance, and $c_{\tau\tau}$ is a U-tank restoring term.

Figure 25:
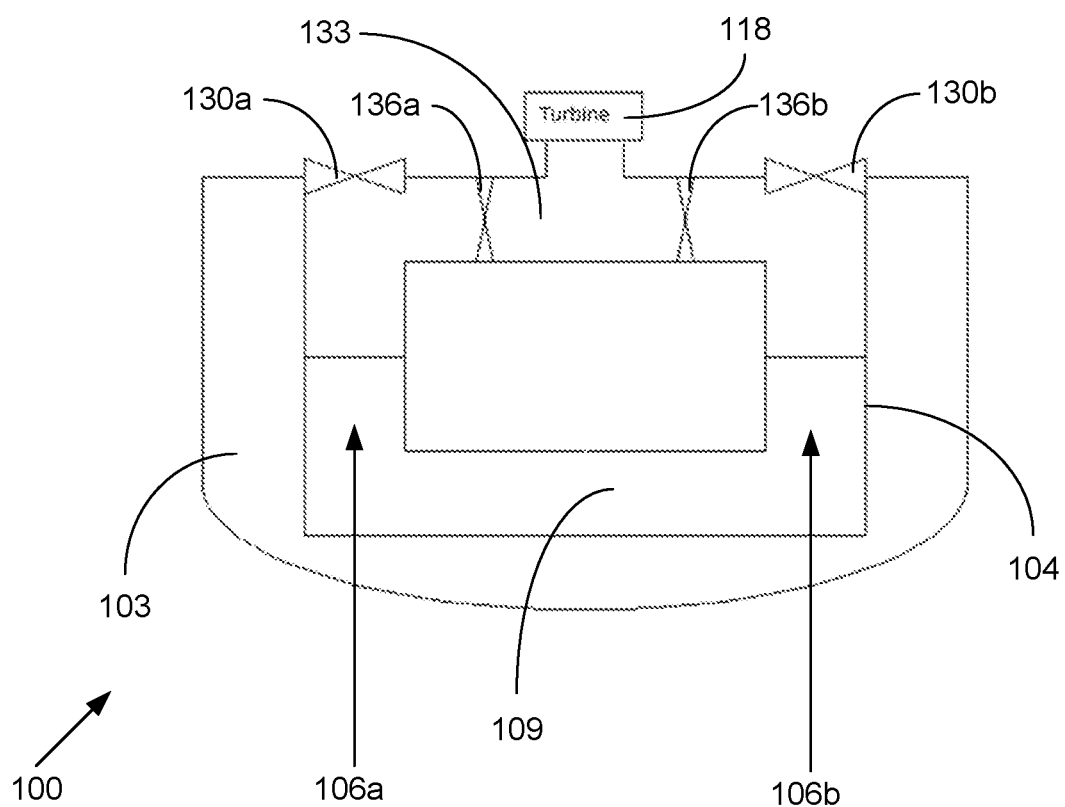
FIG. 25 is a side view of an alternative configuration for the wave energy converter according to one or more embodiments.

FIG. 25 is a side view of an alternative configuration for the wave energy converter 100 according to one or more embodiments. The configuration as shown in FIG. 25 may use a single turbine 118 and the air is vented through the turbine 118 in a single direction. Although the other configuration harnesses the air flow in both chambers from the reciprocating action of air inhalation and exhalation, the configuration in FIG. 25 takes advantage of continuous flow of air in one direction and as such, the turbine blades can be designed asymmetrically to improve its efficiency. The vertical columns 106a and 106b each have respective air admittance valves 130a and 130b that allow air to come into the respective vertical columns 106. The vertical columns 106 are connected both by at least one horizontal conduit 109 for fluid and also by at least one horizontal conduit 133 for air. Respective air valves 136a and 136b enable control of the air flow between the vertical column 106 and the horizontal conduit 133 and the turbine 118.

The wave energy converter 100 during operation will undergo cyclic alternating inhalation of air from the vertical columns 106 of the U-tank, however, exhalation is always through the turbine 118. The operational state of the valves 130 and 136 are as shown in FIGS. 26 and 27.

Figure 26:
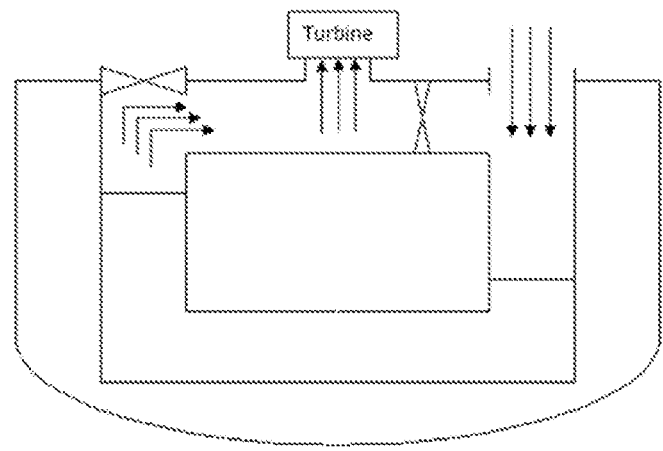
FIGS. 26 and 27 show the operational state of the wave energy converter of FIG. 25 during inhalation from different vertical columns.

FIG. 26 shows the operational state of the wave energy converter 100 (FIG. 25) during inhalation from the vertical column 106b (FIG. 25) with the valve 136b (FIG. 25) opened. Notice the airflow is directed to the turbine for exhalation because the left inlet valve 136a (FIG. 25) is closed. FIG. 27 shows the operational state of the wave energy converter 100 (FIG. 25) during inhalation from the vertical column 106a (FIG. 25) with the inlet valve 136a (FIG. 25) opened. Notice the airflow is directed to the turbine 118 (FIG. 25) for exhalation because the right inlet valve 136b (FIG. 25) is closed.

Figure 28:
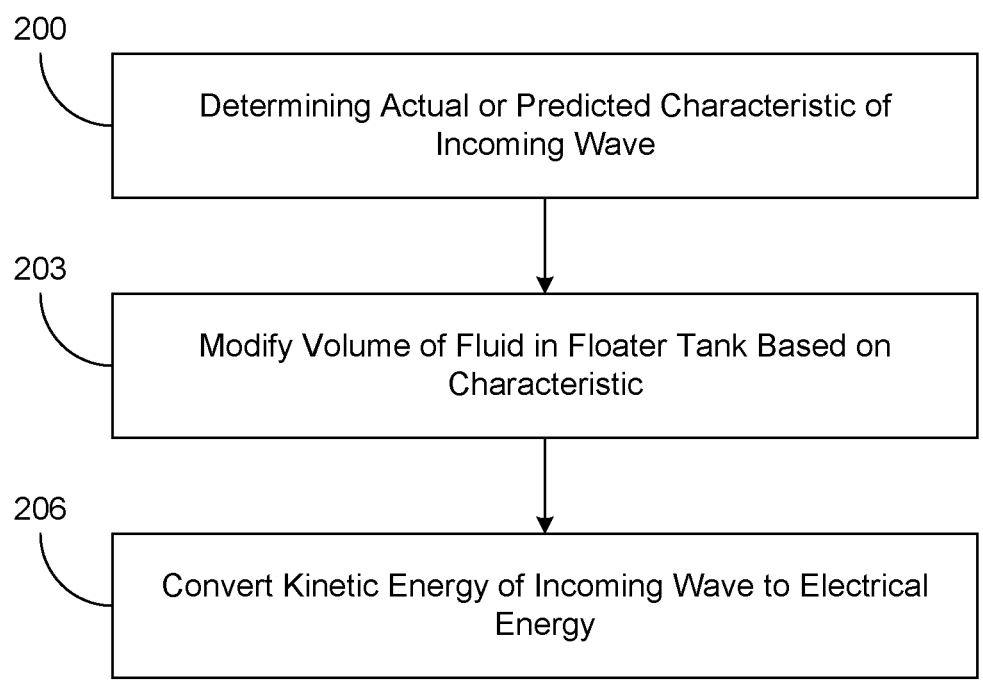
FIG. 28 is a flowchart illustrating a method for converting kinetic energy of a wave to electrical energy according to one or more embodiments.

FIG. 28 is a flowchart illustrating a method for converting kinetic energy of an incoming wave on a body of water to electrical energy. Beginning with box 200, one or more actual or predicted characteristics of an incoming wave are determined. In one example, data is received by a network indicating one or more parameters associated with a current location of the floater on a body of water, and the actual or predicted characteristic of the incoming wave is determined based at least in part on the data. That is to say, different locations may be associated with different wave characteristics generally based upon different sea conditions or weather at the locations. In another example, the actual or predicted characteristic is determined based at least in part on one or more sensors of the floater that can detect wave characteristics.

In box 203, the volume of fluid in the tank of the floater is modified based at least in part on the actual or predicted characteristic. Modifying the volume of fluid in the tank may include, for example, pumping water from the body of water into the tank, or discharging fluid from the tank into the body of water. Modifying the volume of fluid may optimize converting the kinetic energy to the electrical energy.

In box 206, in response to the floater pitching due to the incoming wave, the kinetic energy of the incoming wave is converted to electrical energy by a motion of the volume of fluid in the tank causing air to be released or admitted via the air turbine. For example, in one embodiment, air is released from a first vertical column via a first air turbine, and air is admitted to a second vertical column via a second air turbine. A horizontal distance between the vertical columns may be configured to optimize converting the kinetic energy to the electrical energy.

Figure 29:
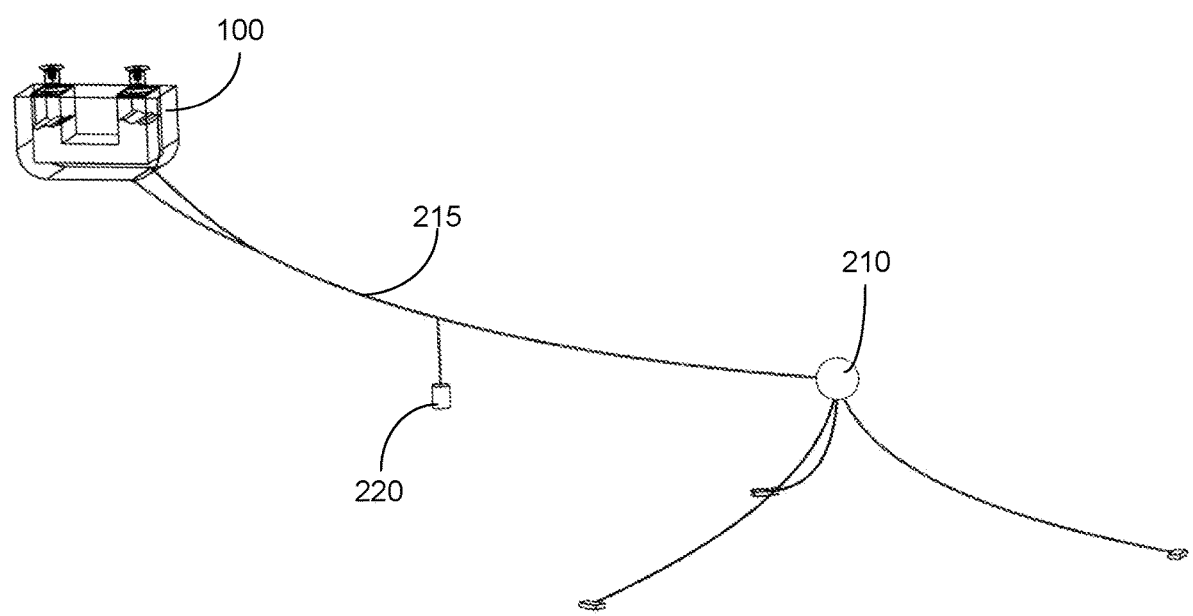
FIG. 29 illustrates a side view of a mooring system that may be employed in connection with the wave energy converter of FIG. 1 according to one or more embodiments.

FIG. 29 illustrates a side view of a mooring system 210 that may be employed in connection with the wave energy converter 100. The mooring system 210 may include mooring cables 215, which can include electrical transmission cables. The mooring cables 215 may be weighted by a weight 220. The wave energy converter 100 may be permitted by the mooring system 210 to move 360 degrees about the mooring system 210 in response to wave motion.

The features, structures, or characteristics described above may be combined in one or more embodiments in any suitable manner, and the features discussed in the various embodiments are interchangeable, if possible. In the following description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

The embodiments described herein can be implemented in hardware, software, or a combination of hardware and software. If embodied in software, the functions, steps, and elements can be implemented as a module or set of code that includes program instructions to implement the specified logical functions. The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

The embodiments can be implemented by at least one processing circuit or device and at least one memory circuit or device. Such a processing circuit can include, for example, one or more processors and one or more storage or memory devices coupled to a local interface. The local interface can include, for example, a data bus with an accompanying address/control bus or any other suitable bus structure. The memory circuit can store data or components that are executable by the processing circuit.

If embodied as hardware, the functions, steps, and elements can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, and/or programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Although the relative terms such as "on," "below," "upper," and "lower" are used in the specification to describe the relative relationship of one component to another component, these terms are used in this specification for convenience only, for example, as a direction in an example shown in the drawings. It should be understood that if the device is turned upside down, the "upper" component described above will become a "lower" component. When a structure is "on" another structure, it is possible that the structure is integrally formed on another structure, or that the structure is "directly" disposed on another structure, or that the structure is "indirectly" disposed on the other structure through other structures.

In this specification, the terms such as "a," "an," "the," and "said" are used to indicate the presence of one or more elements and components. The terms "comprise," "include," "have," "contain," and their variants are used to be open ended, and are meant to include additional elements, components, etc., in addition to the listed elements, components, etc. unless otherwise specified in the appended claims. If a component is described as having "one or more" of the component, it is understood that the component can be referred to as "at least one" component.

The terms "first," "second," etc. are used only as labels, rather than a limitation for a number of the objects. It is understood that if multiple components are shown, the components may be referred to as a "first" component, a "second" component, and so forth, to the extent applicable.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

The above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A wave energy converter, comprising:
   a floater that is buoyant in a body of water, the floater having a geometry such that the floater pitches in an angular motion about a transverse axis in response to an incoming wave in the body of water; and
   a tank in the floater having a plurality of vertical columns, a first vertical column of the plurality of vertical columns comprising a first air turbine, a second vertical column of the plurality of vertical columns comprising a second air turbine, the tank configured to store a volume of fluid and a volume of air, the plurality of vertical columns being connected by at least one horizontal conduit for movement of the volume of fluid between the plurality of vertical columns,
   wherein in response to the floater pitching due to the incoming wave, a motion of the volume of fluid between the plurality of vertical columns via the at least one horizontal conduit causes air to be released or admitted via the first air turbine and the second air turbine to generate electrical power.

2. The wave energy converter of claim 1, wherein the motion of the volume of fluid between the first vertical column and the second vertical column via the at least one horizontal conduit simultaneously causes the air to be released from the first vertical column via the first air turbine and the air to be admitted to the second vertical column via the second air turbine.

3. The wave energy converter of claim 1, wherein the motion of the volume of fluid between the plurality of vertical columns via the at least one horizontal conduit causes air to be released from the first vertical column via the first air turbine based at least in part on an energetic frequency of the incoming wave.

4. The wave energy converter of claim 1, wherein the first air turbine is configured to spin in a same direction in response to the air being released or admitted.

5. The wave energy converter of claim 1, further comprising a device configured to at least:
   add fluid to the volume of fluid in the tank from the body of water; or
   discharge the fluid from the volume of fluid in the tank to the body of water.

6. The wave energy converter of claim 1, wherein a distance or a size of the at least one horizontal conduit is selected based at least in part on a predicted energetic frequency of the incoming wave.

7. A method for converting kinetic energy of an incoming wave on a body of water to electrical energy, the method comprising:
   determining at least one actual or predicted characteristic of the incoming wave;

based at least in part on the at least one actual or predicted characteristic, modifying a volume of fluid in a tank of a floater on the body of water, the floater being buoyant in the body of water, the floater having a geometry such that the floater pitches in an angular motion about a transverse axis in response to the incoming wave, the tank having a plurality of vertical columns, a first vertical column of the plurality of vertical columns comprising a first air turbine, a second vertical column of the plurality of vertical columns comprising a second air turbine, the tank storing the volume of fluid and a volume of air, the plurality of vertical columns being connected by at least one horizontal conduit for movement of the volume of fluid between the plurality of vertical columns; and in response to the floater pitching due to the incoming wave, converting the kinetic energy of the incoming wave to the electrical energy by a motion of the volume of fluid in the tank causing air to be released or admitted via the first air turbine and the second air turbine.

8. The method of claim 7, wherein modifying the volume of fluid in the tank further comprises pumping water from the body of water into the tank.

9. The method of claim 7, wherein modifying the volume of fluid in the tank further comprises discharging fluid from the tank into the body of water.

10. The method of claim 7, wherein modifying the volume of fluid optimizes converting the kinetic energy to the electrical energy.

11. The method of claim 7, further comprising:
receiving data via a network indicating one or more parameters associated with a current location of the floater on the body of water; and
determining the at least one actual or predicted characteristic of the incoming wave based at least in part on the data.

12. The method of claim 7, further comprising determining the at least one actual or predicted characteristic of the incoming wave based at least in part on a sensor of the floater.

13. The method of claim 7, further comprising:
releasing the air from the first vertical column via the first air turbine; and
admitting the air to the second vertical column via the second air turbine.

14. The method of claim 7, wherein a horizontal distance between the plurality of vertical columns is configured to optimize converting the kinetic energy to the electrical energy.

15. A wave energy converter, comprising:
a floater that is buoyant in a body of water, the floater having a geometry such that the floater pitches in an angular motion in response to an incoming wave in the body of water;
a tank in the floater having a plurality of vertical columns, the tank configured to store a volume of fluid and a volume of air the plurality of vertical columns being connected by at least one horizontal conduit for movement of the volume of fluid between the plurality of vertical columns; and
a first air turbine in a first vertical column of the plurality of vertical columns and a second air turbine in a second vertical column of the plurality of vertical columns,
wherein in response to the floater pitching due to the incoming wave, a motion of the volume of fluid between the first vertical column and the second vertical column via the at least one horizontal conduit causes air to be released via the first air turbine and the second air turbine to generate electrical power.

16. The wave energy converter of claim 15, further comprising a respective air admittance valve for individual ones of the plurality of vertical columns.

17. The wave energy converter of claim 16, further comprising a respective air admittance valve for individual ones of the plurality of vertical columns to control airflow between the individual ones of the plurality of vertical columns.

18. The wave energy converter of claim 17, wherein the respective air admittance valves are configured to block airflow between a first vertical column of the plurality of vertical columns and allow airflow between a second vertical column of the plurality of vertical columns.

19. The wave energy converter of claim 18, wherein the air is admitted via the respective air admittance valve of the first vertical column when the air is released from the second vertical column, and the air is admitted via the respective air admittance valve of the second vertical column when the air is released from the first vertical column.

20. The wave energy converter of claim 15, wherein at least one of the first or the second air turbine is optimized for airflow being released.

\* \* \* \* \*